(12) United States Patent
Yamashita

(10) Patent No.: US 10,540,129 B2
(45) Date of Patent: Jan. 21, 2020

(54) INFORMATION PROCESSING DEVICE, INFORMATION PROCESSING SYSTEM, AND INFORMATION PROCESSING METHOD FOR EXECUTING SCRIPT INCLUDED IN PRINT INFORMATION

(71) Applicant: Yuu Yamashita, Kanagawa (JP)

(72) Inventor: Yuu Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 15/697,609

(22) Filed: Sep. 7, 2017

(65) Prior Publication Data

US 2018/0074764 A1 Mar. 15, 2018

(30) Foreign Application Priority Data

Sep. 15, 2016 (JP) .................. 2016-180201
Nov. 29, 2016 (JP) .................. 2016-231107

(51) Int. Cl.
*G06F 3/12* (2006.01)
*G06K 15/02* (2006.01)

(52) U.S. Cl.
CPC .......... *G06F 3/1268* (2013.01); *G06F 3/1276* (2013.01); *G06F 3/1284* (2013.01); *G06K 15/02* (2013.01); *G06F 3/1204* (2013.01); *G06F 3/1253* (2013.01)

(58) Field of Classification Search
CPC .... G06F 3/1268; G06F 3/1204; G06F 3/1208; G06F 3/1205; G06F 3/1225; G06F 3/1276; G06F 3/1284; G06F 3/1253; G06F 15/7878; G06F 3/1277; G06F 12/0855; G06K 15/02
See application file for complete search history.

(56) References Cited

U.S. PATENT DOCUMENTS

| 9,280,727 | B2 | 3/2016 | Yamashita et al. | |
|---|---|---|---|---|
| 2007/0226632 | A1* | 9/2007 | Erola | G06Q 10/10 715/752 |
| 2011/0113321 | A1* | 5/2011 | Han | G06F 3/1206 358/1.15 |
| 2011/0267628 | A1* | 11/2011 | Nishihara | G06F 3/1225 358/1.6 |
| 2011/0273741 | A1* | 11/2011 | Mukasa | G06F 3/1253 358/1.15 |

(Continued)

FOREIGN PATENT DOCUMENTS

JP 2012-226582 11/2012

*Primary Examiner* — Benny Q Tieu
*Assistant Examiner* — Juan M Guillermety
(74) *Attorney, Agent, or Firm* — IPUSA, PLLC

(57) ABSTRACT

There is provided an information processing device for executing a program for printing. The information processing device includes a processor and a memory that stores print information used for printing and instructions, which when executed, cause the processor to execute the following steps: converting data to be printed into print data that is printable by an image forming apparatus; and upon detecting that the print information stored in the memory includes execution information of a predetermined process for the print data generated by the converting step, executing the predetermined process based on the execution information.

14 Claims, 34 Drawing Sheets

(56) References Cited

U.S. PATENT DOCUMENTS

| | | | |
|---|---|---|---|
| 2012/0188575 A1* | 7/2012 | Young | G06F 3/1253 358/1.15 |
| 2013/0003098 A1* | 1/2013 | Hayakawa | G06F 3/1205 358/1.13 |
| 2013/0208300 A1* | 8/2013 | Sakura | G06K 15/4095 358/1.15 |
| 2014/0280795 A1* | 9/2014 | Mori | G06F 3/1289 709/220 |
| 2014/0293312 A1* | 10/2014 | Fukasawa | G06F 3/1205 358/1.15 |
| 2014/0313532 A1* | 10/2014 | Nakamura | G06F 3/1246 358/1.13 |
| 2015/0128154 A1* | 5/2015 | Teibel | G06F 9/44521 719/320 |
| 2015/0301769 A1 | 10/2015 | Yamashita et al. | |
| 2015/0356384 A1* | 12/2015 | Mitsui | G06F 3/1205 358/1.13 |
| 2016/0026903 A1* | 1/2016 | Nakata | G06F 3/1206 358/1.15 |

* cited by examiner

FIG.12A

QueuePropertyBag  ~611

420

...
<psf:ParameterInit name="ns0000:PluginDestinationPass​~1202​">
<psf:Value xsi:type="xsd:string">
¥¥1.2.3.4¥document¥username¥001//PATH OF FILE STORAGE DESTINATION
~1201
</psf:Value>
</psf:ParameterInit>
...

PrintTicket

...

<psf:ParameterInit name="ns0000:PluginDestinationPass ">
<psf:Value xsi:type="xsd:string">
¥¥1.2.3.4¥document¥username¥001//PATH OF FILE STORAGE DESTINATION
</psf:Value>
</psf:ParameterInit>

...

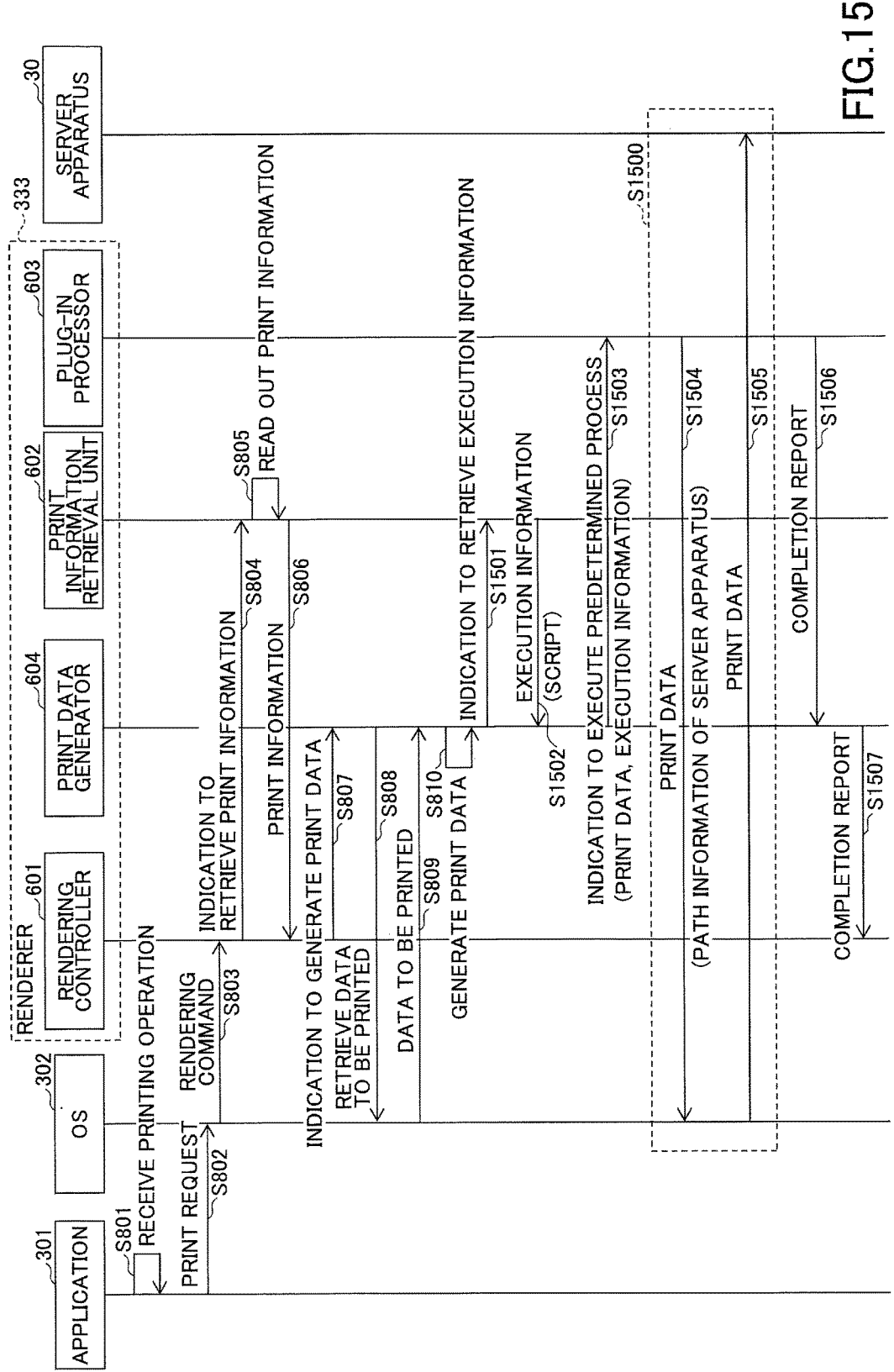

FIG.16B

QueuePropertyBag — 611

```
<psf:ParameterInit name="ns0000:PluginScriptPass ">
<psf:Value xsi:type="xsd:string">
¥¥1.2.3.5.¥scripts¥Upload.js//PATH OF SCRIPT TO BE EXECUTED
</psf:Value>
</psf:ParameterInit>
```
— 1622 (pointing to ¥¥1.2.3.5.¥scripts¥Upload.js)

612 (bracket around ParameterInit block)

PrintTicket — 611

1320

```
<psf:ParameterInit name="ns0000:PluginScript">
<psf:Value xsi:type="xsd:string">
```

SCRIPT TO BE EXECUTED BY PLUG-IN PROCESSOR OR PATH OF SCRIPT — 1711

```
</psf:Value>
</psf:ParameterInit>
```

PRINT INFORMATION STORAGE UNIT — 610

611

```
<psf:ParameterInit name="ns0000:PluginScriptPass ">
  <psf:Value xsi:type="xsd:string">
   ¥¥1.2.3.5.¥EXE¥Upload.exe//PATH OF EXECUTABLE FILE TO BE EXECUTED
  </psf:Value>
</psf:ParameterInit>
```

Figure 23:
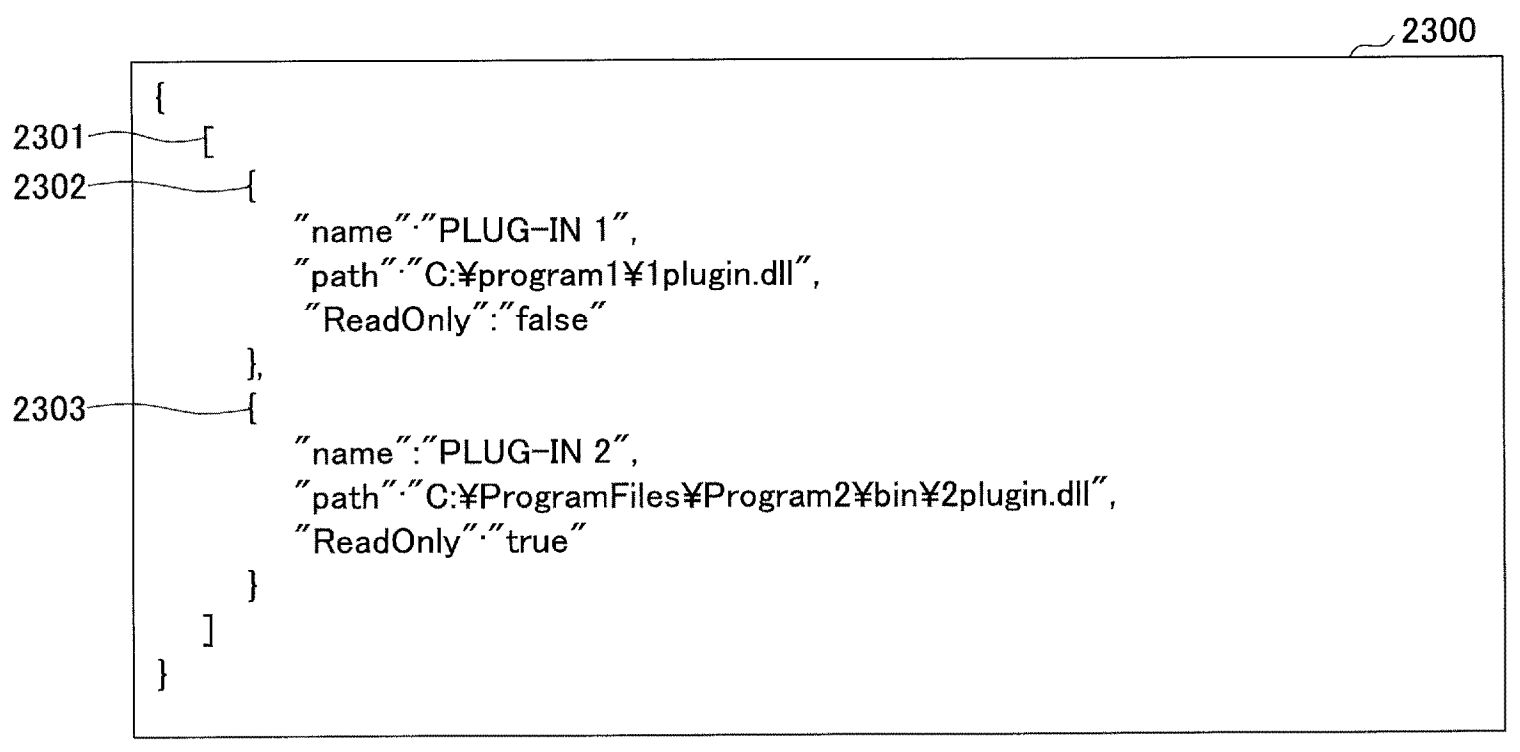

```
{
  [
    "name":"PLUG-IN 1",
    "path":"C:\program1\1plugin.dll",
    "ReadOnly":"false"
  },
  {
    "name":"PLUG-IN 2",
    "path":"C:\ProgramFiles\Program2\bin\2plugin.dll",
    "ReadOnly":"true"
  }
  ]
}
```

```
{
  [
    {
      "name":"PLUG-IN A",
      "path":"C:¥programA¥Aplugin.dll",
      "ReadOnly":"false",
      "Timing":"Start"
    },
    {
      "name":"PLUG-IN B",
      "path":"C:¥ProgramFiles¥ProgramB¥bin¥Bplugin.dll",
      "ReadOnly":"true",
      "Timing":"Page"
    }
  ]
}
```

2800
2801 — "name":"PLUG-IN A", "path":"C:¥programA¥Aplugin.dll", "ReadOnly":"false"
2802 — "Timing":"Start"
2803 — "name":"PLUG-IN B", "path":"C:¥ProgramFiles¥ProgramB¥bin¥Bplugin.dll", "ReadOnly":"true"
2804 — "Timing":"Page"

INFORMATION PROCESSING DEVICE, INFORMATION PROCESSING SYSTEM, AND INFORMATION PROCESSING METHOD FOR EXECUTING SCRIPT INCLUDED IN PRINT INFORMATION

BACKGROUND OF THE INVENTION

1. Field of the Invention

The present disclosure relates to an information processing device, an information processing system, and an information processing method.

2. Description of the Related Art

For Windows Operating Systems (OS) from Windows (registered trademark) 2000 up to Windows 7, an architecture of a printer driver has been adopted, which is referred to as Version 3 (which is denoted as "V3," hereinafter). For Windows OS on and after Windows 8, in addition to the V3 printer driver, a new printer driver architecture has been adopted, which is referred to as Version 4 (which is denoted as "V4," hereinafter).

For the V4 printer driver, a filter pipeline architecture has been adopted. In a filter pipeline architecture, for example, a vendor including a third party can provide its own extension function by adding an original filter module to a printer driver (cf. Patent Document 1 (Japanese Unexamined Patent Publication No. 2012-226582), for example).

In a printer driver including a filter, when a process executed by the filter is to be modified, even if the modification is such that no significant alteration is to be added to the filter, it may be required to reinstall the filter, and therefore user's convenience may be lowered.

Furthermore, for the V3 printer driver, for example, by preparing an original port monitor, function enhancement can be achieved without adding an original filter module to the printer driver. However, for the V4 printer driver, use of an original port monitor is restricted, so that it is difficult for a vendor to prepare an original port monitor to add an original function.

In this manner, according to related art, in a V4 printer driver or a printer driver with a similar restriction, it is difficult to add an original extension function to a printer driver while maintaining user's convenience.

It is desirable to facilitate to add an original extension function to a printer driver, such as the V4 printer driver or a printer driver with a similar restriction, while maintaining user's convenience.

SUMMARY OF THE INVENTION

According to an aspect of the present invention, there is provided an information processing device for executing a program for printing, the information processing device including a processor; and a memory that stores print information used for printing and instructions, which when executed, cause the processor to execute the following steps: converting data to be printed into print data that is printable by an image forming apparatus; and upon detecting that the print information stored in the memory includes execution information of a predetermined process for the print data generated by the converting step, executing the predetermined process based on the execution information.

According to another aspect of the present invention, there is provided an information processing system including an image forming apparatus that performs printing; and an information processing device that executes a program for printing by the image forming apparatus, wherein the information processing device includes a processor; and a memory that stores print information used for printing and instructions, which when executed, cause the processor to execute the following steps: converting data to be printed into print data that is printable by the image forming apparatus; and upon detecting that the print information stored in the memory includes execution information of a predetermined process for the print data generated by the converting step, executing the predetermined process based on the execution information.

According to another aspect of the present invention, there is provided an information processing method executed by an information processing device for executing a program for printing, the information processing device including a processor and a memory that stores print information used for printing, the information processing method including generating print data by converting data to be printed into the print data that is printable by an image forming apparatus; upon detecting that the print information stored in the memory includes execution information of a predetermined process for the print data generated by the generating, executing the predetermined process based on the execution information.

According to an embodiment of the present invention, it can be facilitated to add an original extension function to a printer driver, such as the V4 printer driver or a printer driver with a similar restriction, while maintaining user's convenience.

Other objects, features and advantages of the present invention will become more apparent from the following detailed description when read in conjunction with the accompanying drawings.

BRIEF DESCRIPTION OF THE DRAWINGS

FIG. 12A is a diagram illustrating an example of execution information according to the first example;

FIG. 12B is a diagram illustrating another example of the execution information according to the first example;

FIG. 15 is a sequence diagram illustrating an example of the process by the information processing system according to a second example;

FIG. 16B is a diagram illustrating another example of the execution information according to the second example;

FIG. 17A is a diagram illustrating another example of the execution information according to the second example;

FIG. 17B is a diagram illustrating another example of the execution information according to the second example;

FIG. 23 is a diagram illustrating an example of the execution information according to the fifth example;

FIG. 28 is a diagram illustrating an example of the execution information according to the seventh example;

DETAILED DESCRIPTION OF THE PREFERRED EMBODIMENTS

In the following, embodiments of the present disclosure is described in detail by referring to the accompanying drawings.

<System Configuration>

Figure 1:
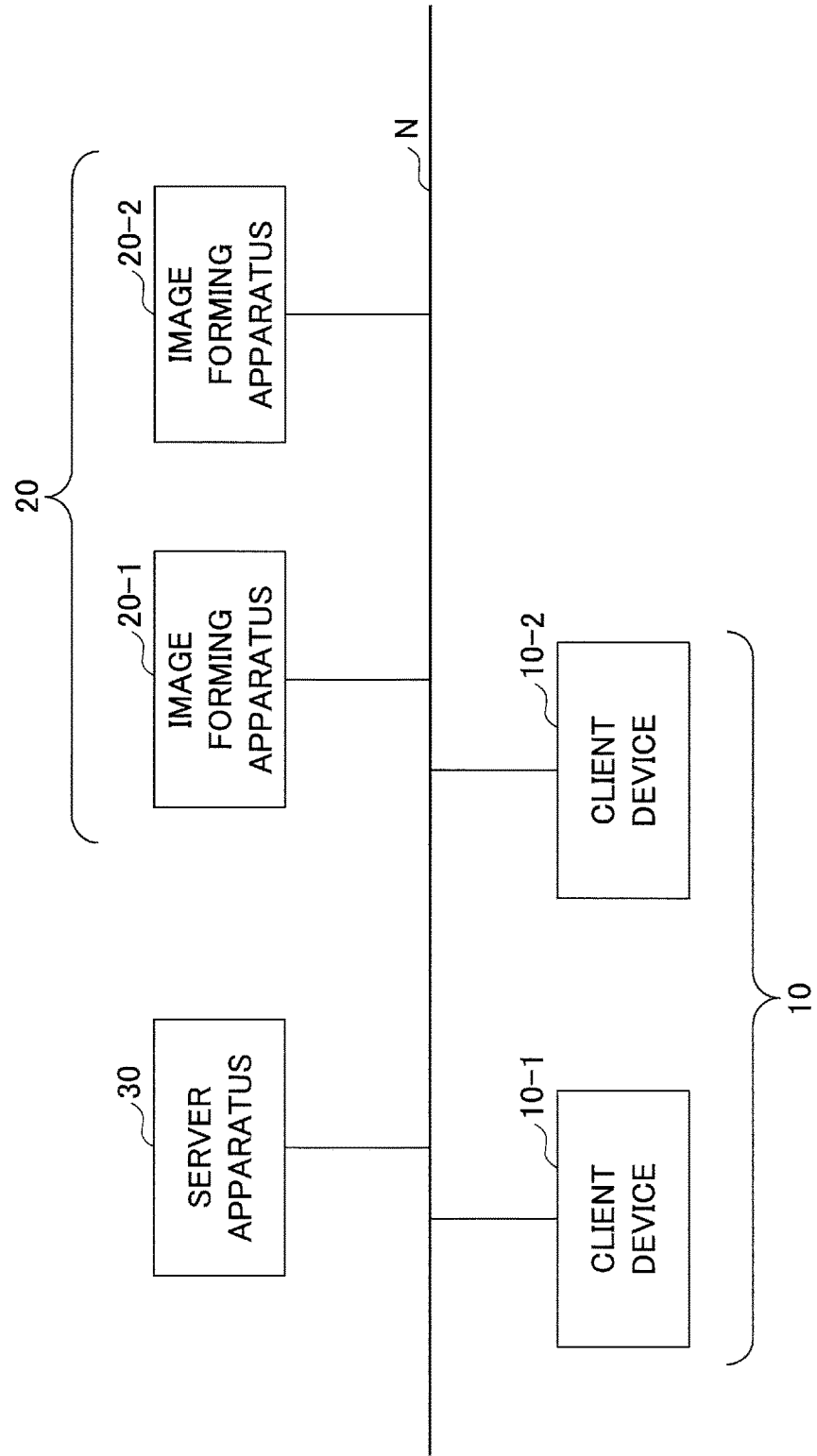
FIG. 1 is a diagram illustrating a system configuration of an example of an information processing system according to an embodiment.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (Local Area Network), so that these devices can communicate each other.

The client device 10 may be, for example, a personal computer (PC), a smartphone, or a tablet terminal. Upon receiving, for example, a print command from a user, the client device 10 creates print data from data to be printed, and the client device 10 transmits the print data to the image forming apparatus 20. Alternatively, upon receiving, for example, a print command from a user, the client device 10 transmits data to be printed to the server apparatus 30.

Note that the data to be printed is, for example, printable electronic data, such as image data and document data. Furthermore, the print data is, for example, electronic data obtained by converting the data to be printed into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from data to be printed received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2," for example. Similarly, when the one or more image forming apparatuses 20 are to be distinguished from each other, the one or more image forming apparatuses 20 may be denoted as "image forming apparatus 20-1" and "image forming apparatus 20-2," for example.

<Hardware Configuration>

Figure 2:
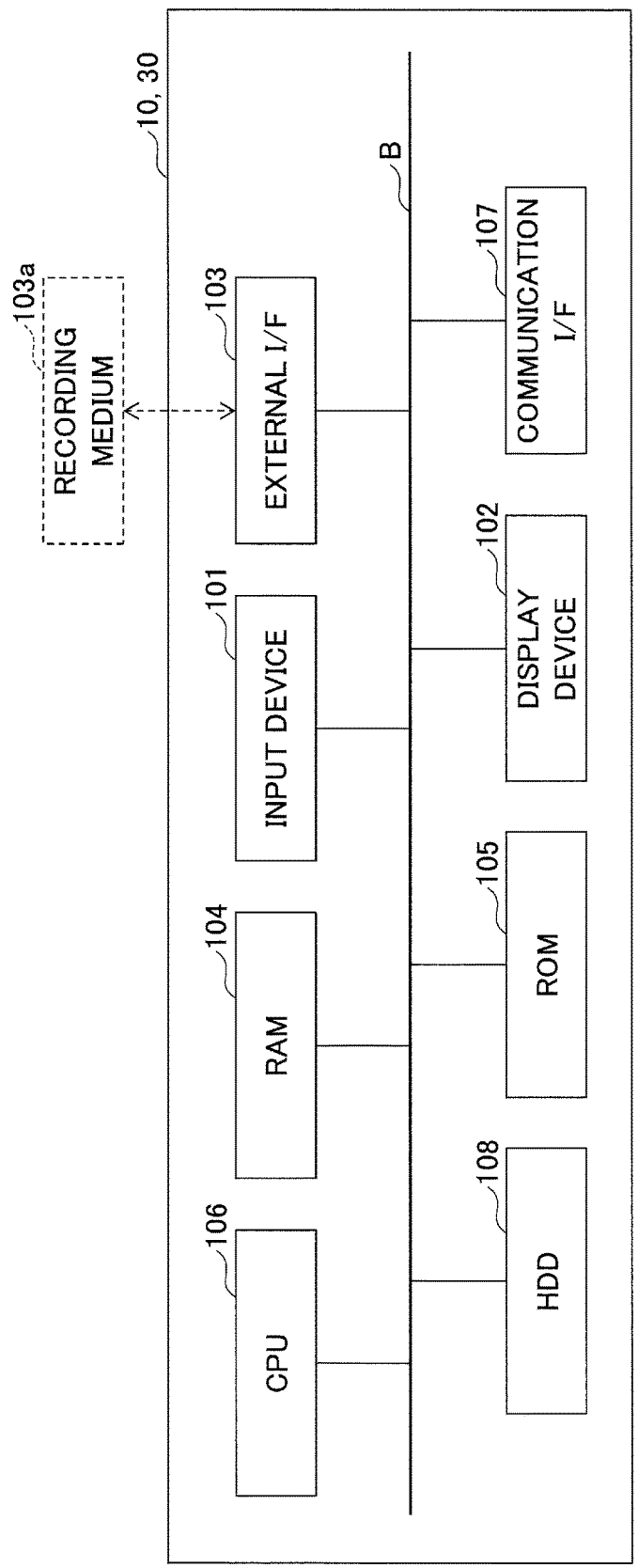
FIG. 2 is a diagram illustrating a hardware configuration of an example of each of a client device and a server apparatus according to the embodiment.
Figure 3:
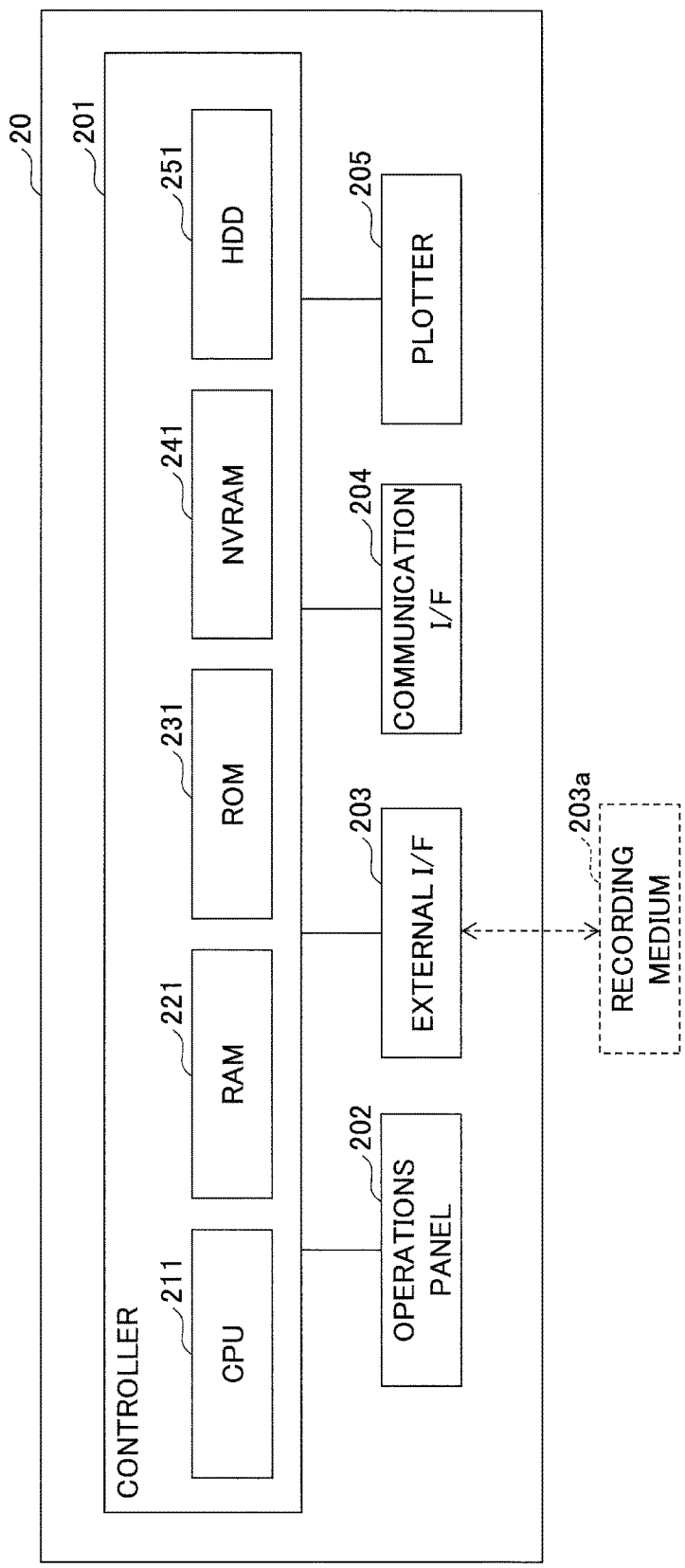
FIG. 3 is a diagram illustrating a hardware configuration of an example of an image forming apparatus according to the embodiment.

Next, hardware configurations of the client device 10, the image forming apparatus 20, and the server apparatus 30 that are included in the information processing system 1 according to the embodiment are described by referring to FIG. 2 and FIG. 3.

<<The Client Device 10 and the Server Apparatus 30>>

FIG. 2 is a diagram illustrating hardware configurations of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external I/F 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be configured such that it is coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

<<The Image Forming Apparatus 20>>

FIG. 3 is a diagram illustrating a hardware configuration of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, configuration information. Furthermore, the HDD 251 is a non-volatile storage device that stores various types of programs and data.

The CPU 211 is a processor that implements overall control and other functions of the image forming apparatus 20 by reading out a program, data, configuration information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, and a Universal Serial Bus (USB) memory.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
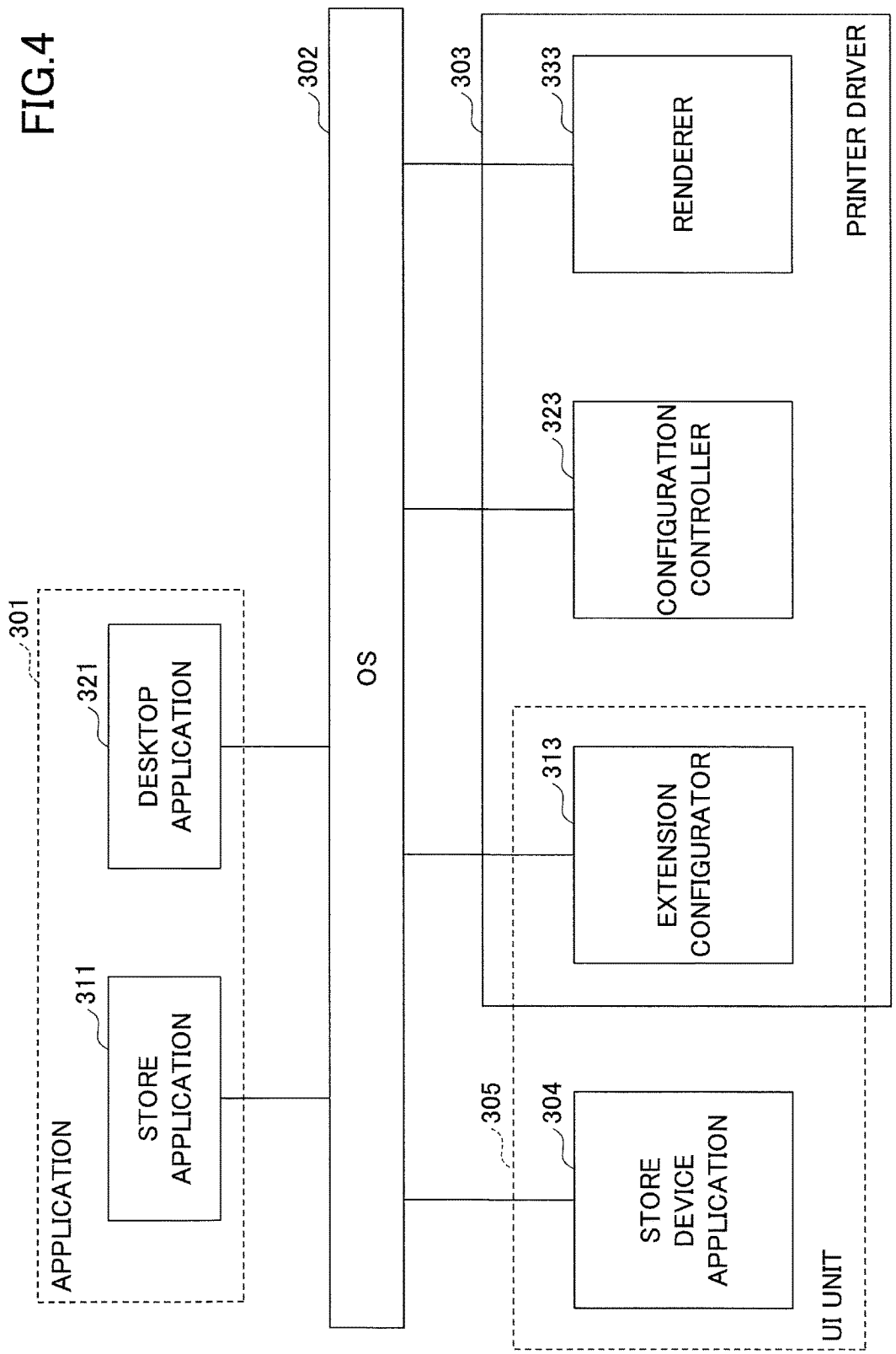
FIG. 4 is a diagram illustrating a software configuration of an example of the client device.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; a store device application 304.

The application 301 is application software, such as document creation software, image browsing/editing software, a browser, that is capable of indicating the OS 302 to print, in response to receiving a print command from a user. The application 301 includes a store application 311 and a desktop application 321.

The store application 311 is, for example, an application that is available from "Windows Store" that provides applications to Windows (registered trademark) 8/Windows RT and Windows OSs on and subsequent to Windows 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI."

The desktop application 321 is, for example, an application that can be used with an Windows OS on and prior to Windows 7.

The OS 302 is one of Windows 8/Windows RT and Windows OSs on and subsequent to Windows 8/Windows RT.

The printer driver 303 is, for example, a Version 4 printer driver (which is denoted as "V4 printer driver," hereinafter). A V4 printer driver is based on an architecture adopted from Windows 8/Windows RT. In the following, the printer driver 303 may also be denoted as "V4 printer driver 303."

Note that, in Windows OS on and after Windows 8, the V4 printer driver can be used, in addition to the Version 3 printer driver (which is denoted as "V3 printer driver," hereinafter), which has been used from Windows 2000 through Windows 7.

The printer driver 303 includes an extension configurator 313; a configuration controller 323; and a renderer 333.

The extension configurator 313 may also be referred to as a printer extension. In response to detecting that the desktop application 321 executes printing, the extension configurator 313 displays a print configuration screen specific to a vendor.

The configuration controller 323 may also be referred to as a line-breaking script. For example, the configuration controller 323 verifies whether a combination of print configurations is valid. For example, the extension configurator 313 may hide a combination of print configurations that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from DevmodePropertyBag, configuration values of respective functions configured in the printer driver 303, and the configuration controller 323 returns PrintTicket indicating the retrieved configuration values. Additionally, the configuration controller 323 stores the configuration values indicated by PrintTicket in DevmodePropertyBag.

Note that PrintCapability and PrintTicket returned to the OS 302 are used, for example, for displaying current values of respective functions and choices in the print configuration screen displayed by the extension configurator 313.

In response to detecting, by the application 301, that a print command for printing the data to be printed is received, the renderer 333 creates print data from the data to be printed.

Upon detecting that the store application 311 is to perform printing, the store device application 304 displays a print configuration screen specific to a vendor. Note that, similar to the store application 311, the store device application 304 is available from "Windows store."

Upon detecting that the desktop application 321 is to perform printing, the printer driver 303 may create print data based on the details of the configuration that are made in the print configuration screen displayed by the extension configurator 313. In contrast, upon detecting that the store application 311 is to perform printing, the printer driver 303 may create print data based on the details of the configuration that are made in the print configuration screen displayed by the store device application 304.

The extension configurator 313 and the store device application 304 form a UI unit 305 for displaying a print configuration screen specific to a vendor.

<Storage Area that can be Accessed by the V4 Printer Driver 303 and the Store Device Application 304>

Figure 5:
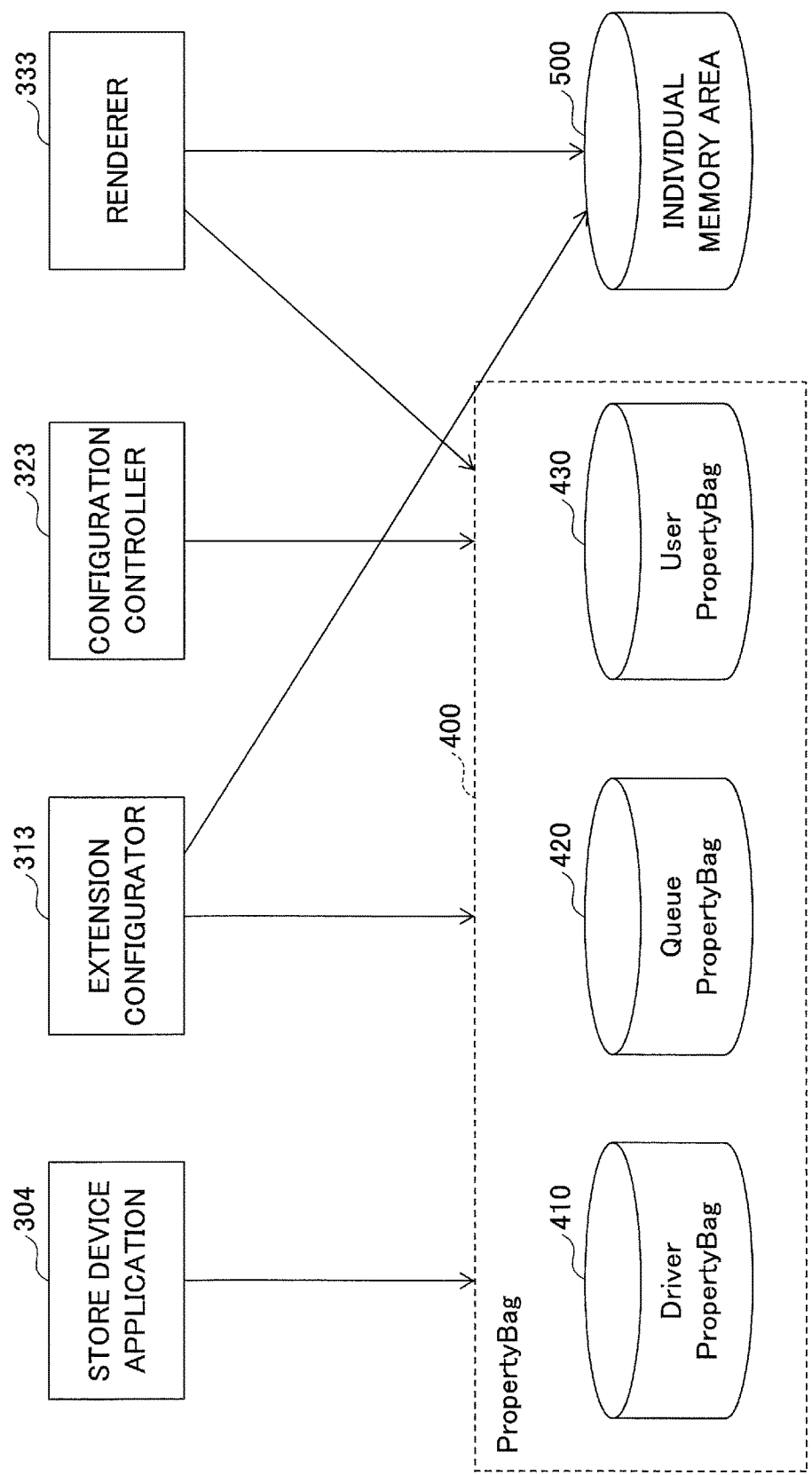
FIG. 5 is a diagram illustrating a storage area accessible by a V4 printer driver and a store device application.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as Property Bag 400. Note that, such access to the storage area can be executed using an Application Programming Interface (API) provided by the OS 302.

As illustrated in FIG. 5, the PropertyBag 400 includes DriverPropertyBag 410; QueuePropertyBag 420; and UserPropertyBag 430.

The DriverPropertyBag 410 is a storage area for storing configuration information that is determined upon creating the V4 printer driver 303. The extension configurator 313, the configuration controller 323, the renderer 333, and the store device application 304 are capable of reading out various types of information from the DriverPropertyBag 410. However, the extension configurator 313, the configuration controller 323, the renderer 33, and the store device application 304 are incapable of writing information in the DriverPropertyBag 410.

The QueuePropertyBag 420 is a storage area for storing configuration information for each logical printer (printer icon). The extension configurator 313 and the store device application 304 are capable of reading out various types of information from and writing various types of information in the QueuePropertyBag 420. Furthermore, the setting controller 323 and the renderer 333 are capable of reading out various types of information from the QueuePropertyBag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The UserPropertyBag 430 is a storage area that stores, for each logical printer, configuration information for each user. The extension configurator 313, the configuration controller 323, and the store device application 304 are capable of reading out various types of information from and writing various types of information in the UserPropertyBag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the PropertyBag 400. The individual memory area 500 is defined by a vendor that provides the V4 printer driver 303.

Due to the restriction applied by the OS 302, the store device application 304 is incapable of accessing a storage area other than the PropertyBag 400. Furthermore, the configuration controller 323 is incapable of accessing a storage area other than the DevmodePropertyBag and the PropertyBag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

<Functional Configuration>

Figure 6:
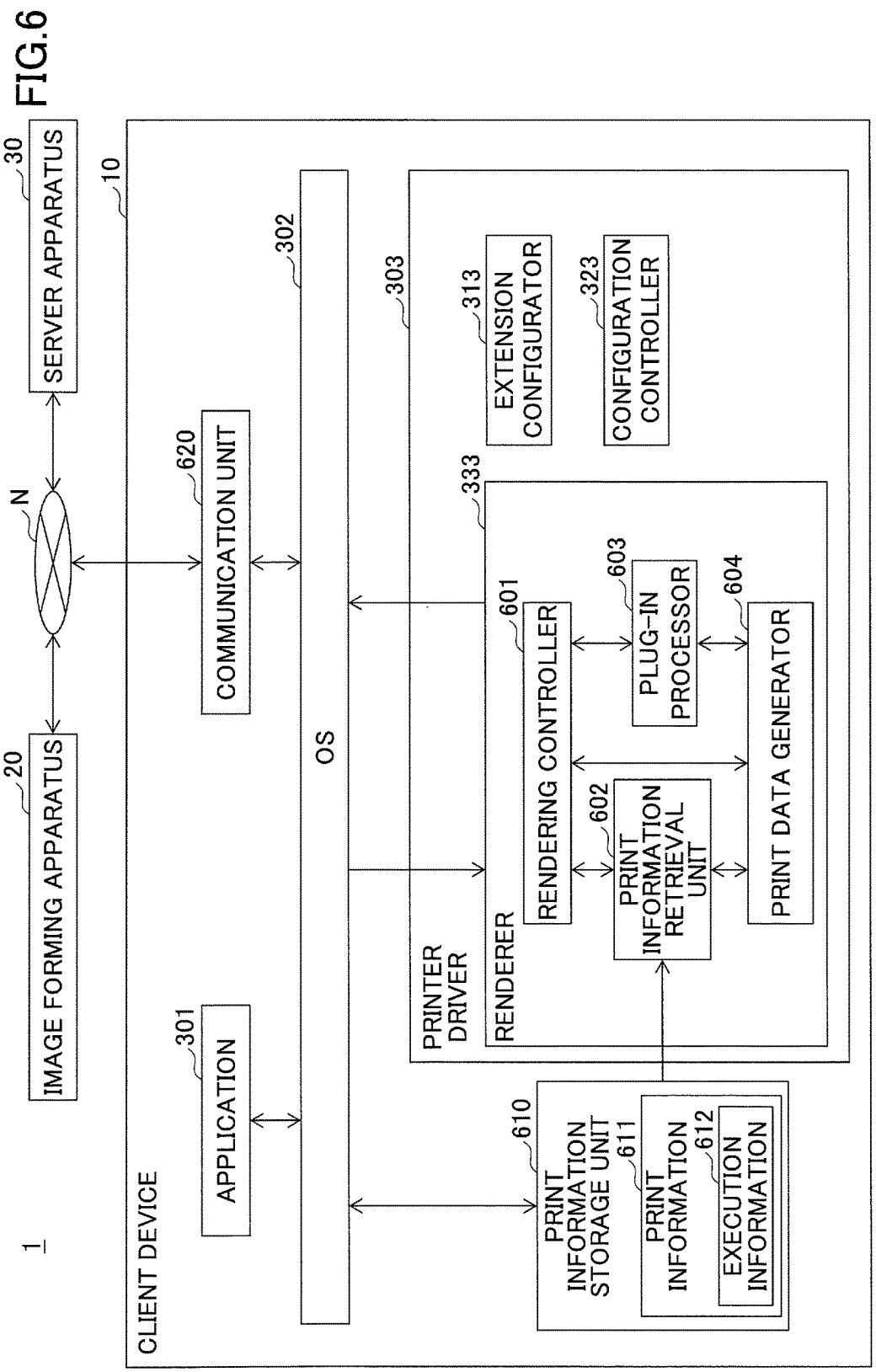
FIG. 6 is a diagram illustrating an example of a functional configuration of a client device according to the embodiment.

FIG. 6 is a diagram illustrating an example of a functional configuration of the client device 10 according to the embodiment.

The client device (information processing device) 10 is coupled to the image forming apparatus 20 and the server apparatus 30 through the network N. The client device 10 is an information processing device that executes a printer driver (a program that controls printing).

As illustrated in FIG. 6, the client device 10 includes an application (application program) 301; an OS 302; a printer driver 303; a print information storage unit 610; and a communication unit 620. Among these components, the application 301, the OS 302, and the printer driver 303 respectively correspond to the application 301, the OS 302, and the printer driver 303 that are depicted in FIG. 4.

The print information storage unit 610 is a storage area that can be used by the printer driver 303. The print information storage unit 610 stores print information 611 that is used by the printer driver 303 for printing. The print information storage unit 610 may be implemented, for example, by the PrintTicket, a registry, the PropertyBag 400 that is described by referring to FIG. 5, or the individual memory area 500.

The print information storage unit 610 may preferably be implemented by the QueuePropertyBag 420 or by the PrintTicket. Note that the PrintTicket is a storage area created by the application 301 for each print (job), and the PrintTicket stores the print information 611 that is the information used by the printer driver 303 for printing.

The print information 611 includes, for example, configuration information for printing that is configured by the application 301, default configuration information retained by the printer driver 303, and information about the image forming apparatus 20.

Additionally, the print information 611 according to the embodiment includes execution information 612 of a predetermined process related to print data generated by the renderer 333.

The predetermined process includes various processes, such as a process of uploading print data to the server apparatus 30, a process of displaying a preview of print data, and a process of receiving a change in the print configuration with respect to a displayed preview.

Further, the execution information 612 includes, for example, configuration information of a predetermined process to be executed by a plug-in processor 603, a plug-in executed by the plug-in processor 603, or reference information indicating a location from which a plug-in is obtained.

The communication unit 620 is a device for the client device 10 to communicate with the image forming apparatus 20 or the server apparatus 30 through the network N. The communication unit 620 is implemented, for example, by the OS 302 executed by the client device 10 and the communication I/F 107 of FIG. 2.

The printer driver 303 is a program for controlling printing. As described by referring to FIG. 4, the printer driver 303 includes the extension configurator 313, the configuration controller 323, and the renderer 333. In the embodiment, the extension configurator 313 and the configuration controller 323 may be the same as respective configurations of a generic printer driver. Thus, the descriptions of the extension configurator 313 and the configuration controller 323 are omitted.

The renderer 333 is a unit that creates print data from data to be printed, for which a print command is received in the application 301. The renderer 333 includes, for example, a rendering controller 601, a print information retrieval unit 602, the plug-in processor 603, and a print data generator 604. Note that the renderer 333 is implemented, for example, by one filter module of a V4 printer driver that adopts the filter pipeline architecture.

When an application that requests to print starts printing, the rendering controller 601 controls a rendering process executed by the renderer 333 in accordance with a print request (rendering command) transmitted from the OS 302.

For example, in response to receiving a request from the rendering controller 601 or from the print data generator 604, the print information retrieval unit 602 retrieves, from the print information storage unit 610, the print information 611 that is used by the renderer 333 for printing.

Upon detecting that the print information 611 stored in the print information storage unit 610 includes execution information 612 that is information about a predetermined process related to print data to be generated by the renderer 333, the plug-in processor (processing unit) 603 executes a predetermined process based on the execution information 612.

For example, the plug-in processor 603 is provided with, in advance, a function for executing a predetermined process, such as a process of uploading print data to the server apparatus 30. Furthermore, the execution information 612 includes configuration information that is required for executing a predetermined process, such as path information (an example of address information) of a destination of uploading.

As another example, the execution information 612 includes a script (or an executable file) for implementing a predetermined process, such as a process of uploading print data to the server apparatus 30, or reference information indicating a location from which a script can be obtained. Furthermore, the plug-in processor 603 executes a script (or an executable file) for implementing a predetermined process.

The print data generator 604 converts data to be printed into print data that can be printed by the image forming apparatus 20 based on the print information 611 stored in the print information storage unit 610.

By the above-described configuration, upon detecting that the print information 611 stored in the print information storage unit 610 includes execution information 612 for a predetermined process, the renderer 333 of the printer driver 303 can execute, in addition to a process of generating print data, the predetermined process.

Furthermore, in a V4 printer driver including one or more filters (the renderer 333), the rendering controller 601, the print information retrieval unit 602, the plug-in processor 603, and the print data generator 604 are provided within a range of the one filter.

<Outline of the Process>

Next, a processing flow of the information processing method is described, which is executed by the client device 10 and the information processing system 1 according to the embodiment.

(Outline of the Rendering Process by the Printer Driver)

Figure 7:
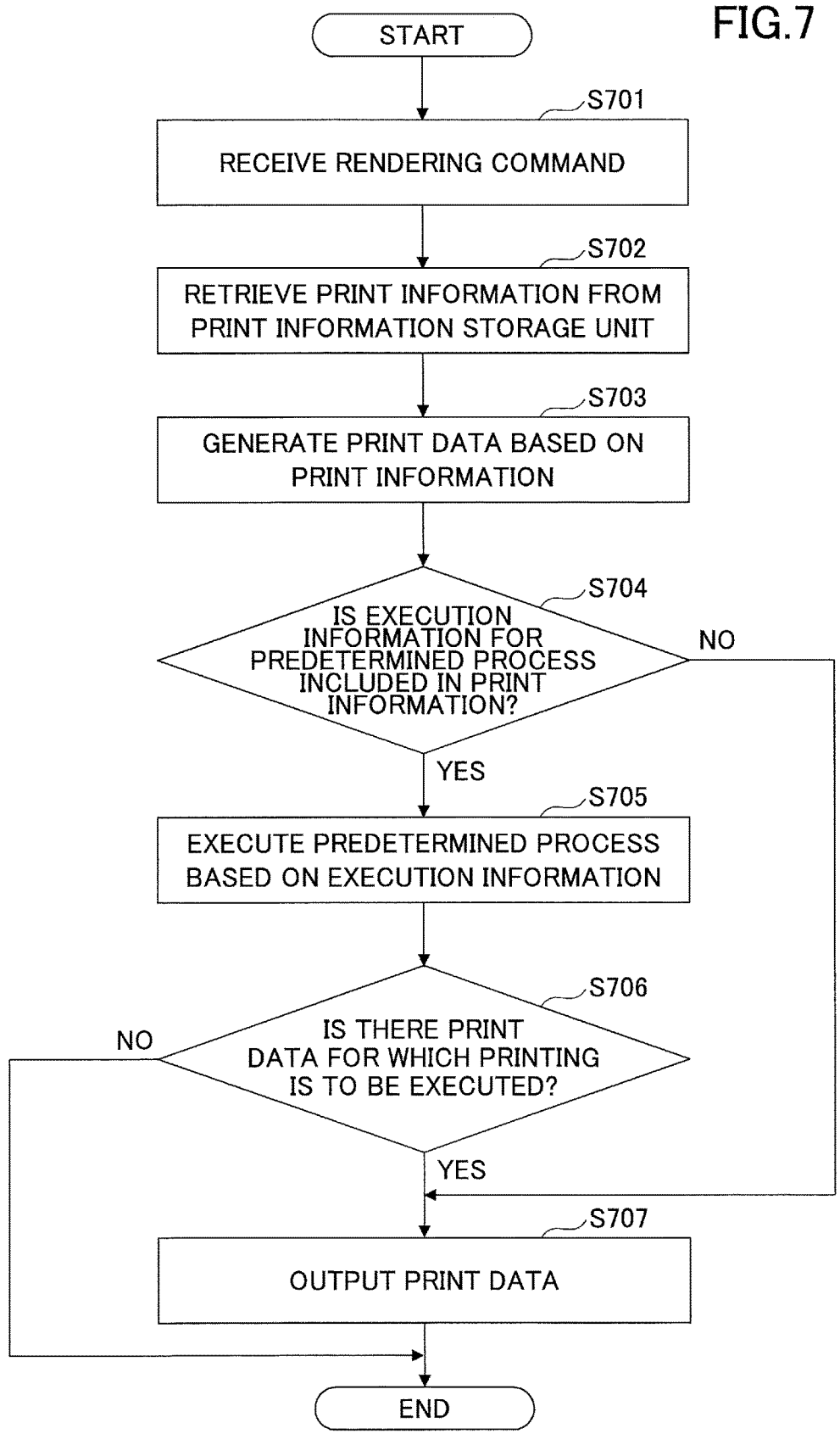
FIG. 7 is a flowchart illustrating an outline of a drawing process by a printer driver according to the embodiment.

FIG. 7 is a flowchart illustrating an outline of the rendering process by the printer driver 303 according to the embodiment.

At step S701, upon receiving a print request from the application 301 that requests printing, the rendering controller 601 of the printer driver 303 receives a rendering command that requests printing (rendering), which is transmitted from the OS 302.

At step S702, the rendering controller 601 retrieves, from the print information storage unit 610, the print information 611, which is information used for printing, using the print information retrieval unit 602. The print information 611 includes, for example, configuration information of printing that is configured by the application 301, default configuration information retained by the printer driver 303, information about the image forming apparatus 20, and execution information 612 for a predetermined process.

At step 703, for example, the rendering controller 601 indicates the print data generator 604 to generate print data, and the print data generator 604 converts data to be printed into print data (generates the print data) based on the print information 611.

At step S704, the rendering controller 601 (or the print data generator 604) determines whether the print information 611 stored in the print information storage unit 610 includes execution information 612 for the predetermined process.

Upon detecting that the print information 611 stored in the print information storage unit 610 does not include the execution information 612 for the predetermined process, the rendering controller 601 (or the print data generator 604) causes the process to proceed to step S707. However, upon detecting that the print information 611 stored in the print information storage unit 610 includes the execution information 612, the rendering controller 601 (or the print data generator 604) causes the process to proceed to step S705.

After transitioning to step S705, the plug-in processor 603 executes the predetermined process (e.g., a process of uploading the generated print data to the server apparatus 30) based on the execution information 612 for the predetermined process.

At step S706, the rendering controller 601 determines whether there is print data for which printing is to be executed. The reason for executing the above-described determination is that, in some cases, it is not necessary to print the print data, such as a case where the predetermined process executed at step S705 is the process of uploading the print data to the server apparatus 30.

Upon detecting that there is no print data for which printing is to be executed, the rendering controller 601 terminates the rendering process. However, upon detecting that there is print data for which printing is to be executed, the rendering controller 601 causes the process to proceed to step S707.

After transitioning to step S707, the rendering controller 601 outputs the print data generated by the print data generator 604 to a spooler of the OS 302. The OS 302 transmits the print data to the image forming apparatus 20 through the communication unit 620.

Note that the processing flow illustrated in FIG. 7 is an example. For example, the process at step S704 and the process at step S705 of FIG. 7 may be executed prior to step S703.

Furthermore, the process at step S706 of FIG. 7 may be omitted. For example, if there is no print data at step S706, no print data is output at step S707. Thus, the process at step S707 may be executed without executing the determination at step S706.

(Example of the Process by the Information Processing System)

Next, a basic processing flow of the information processing method is described in more detail, which is executed by the information processing system 1 according to the embodiment, using a sequence diagram.

Figure 8:
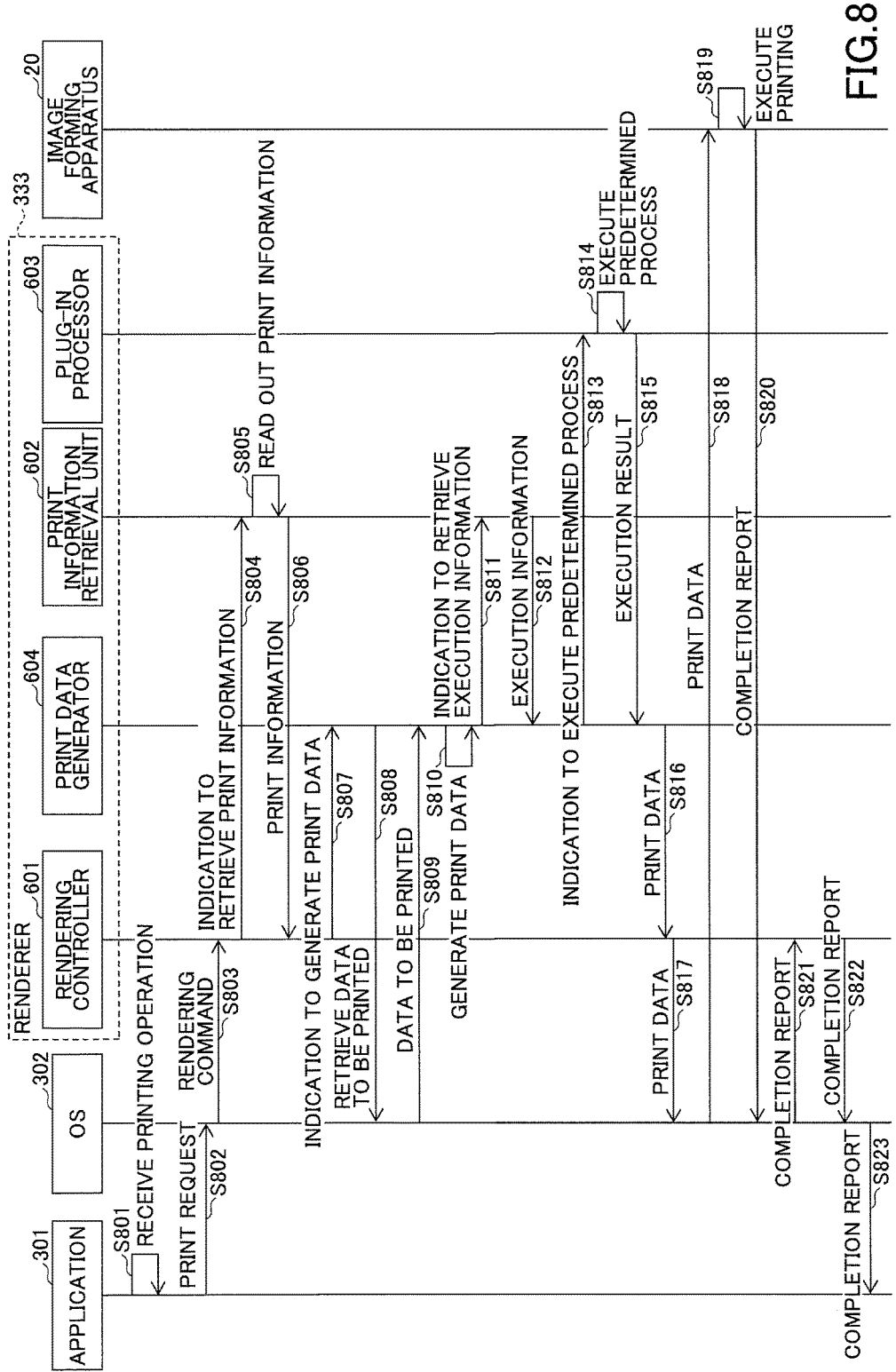
FIG. 8 is a sequence diagram illustrating an example of a process by the information processing system according to the embodiment.

FIG. 8 is a sequence diagram illustrating an example of the process by the information processing system according to the embodiment.

In response to receiving a printing operation by a user at step S801, the application 301 transmits a print request for requesting printing to the OS 302 at step S802.

Upon receiving the print request from the application 301, the OS 302 transmits, to the printer driver 303, a rendering command for indicating to render the data to be printed (to create print data) at step S803. Here, the rendering command transmitted to the printer driver 303 is received by the rendering controller 601 of the renderer 333.

Upon receiving the rendering command transmitted from the OS 302, the rendering controller 601 indicates the print information retrieval unit 602 to retrieve print information at step S804.

At step S805, the print information retrieval unit 602 reads out print information stored in the print information storage unit 610. Here, as an example, suppose that the print information retrieval unit 602 reads out, from the print information 611 stored in the print information storage unit 610, configuration information for printing that is stored by the application 301, default configuration information of the printer driver 303, and information about the image forming apparatus 20.

At step S806, the print information retrieval unit 602 outputs the retrieved print information to the rendering controller 601.

At step S807, the rendering controller 601 indicates the print data generator 604 to generate print data. The indication includes, for example, the print information received at step S806.

At steps S808 and S809, the print data generator 604 retrieves the data to be printed from the spooler of the OS 302 storing the data to be printed.

At step S801, based on the print information transmitted from the rendering controller 601, the print data generator 604 generates the print data by converting the data to be printed into the print data that can be printed by the image forming apparatus 20.

At steps S811 and S812, the print data generator 604 retrieves the execution information 612 included in the print information 611 stored in the print information storage unit 610 using the print information retrieval unit 602. In the following, the information processing method is described by assuming that the execution information 612 for the predetermined process is included in the print information 611.

At step S813, the print data generator 604 indicates the plug-in processor 603 to execute the predetermined process (plug-in) using the retrieved execution information 612. Note that the specific examples of the execution information 612 and the predetermined process are described below in examples 1 through 4.

At step S814, the plug-in processor 603 executes the predetermined process indicated by the print data generator 604. After completing the predetermined process, at step S815, the plug-in processor 603 transmits the execution result of the predetermined process.

At steps S816 and S817, in response to detecting that there is the print data which is to be printed, the print data generator 604 outputs the generated print data to the spooler of the OS 302 through the rendering controller 601.

At step S818, the OS 302 transmits the print data received from the printer driver 303 to the image forming apparatus 20 using the communication unit 620.

At step S819, the image forming apparatus 20 prints the print data received from the OS 302 of the client device 10. At step 820, the image forming apparatus 20 transmits, to the OS 302 of the client device 10, a completion report indicating that printing has been completed.

At steps S821, S822, and S823, the completion report received by the OS 302 is transmitted to the printer driver 303 (the rendering controller 601) and the application 301.

In the process illustrated in FIG. 8, the print data generator 604 controls execution of the predetermined process by the plug-in processor 603. However, this control may be executed by the rendering controller 601.

Another Example

Figure 9:
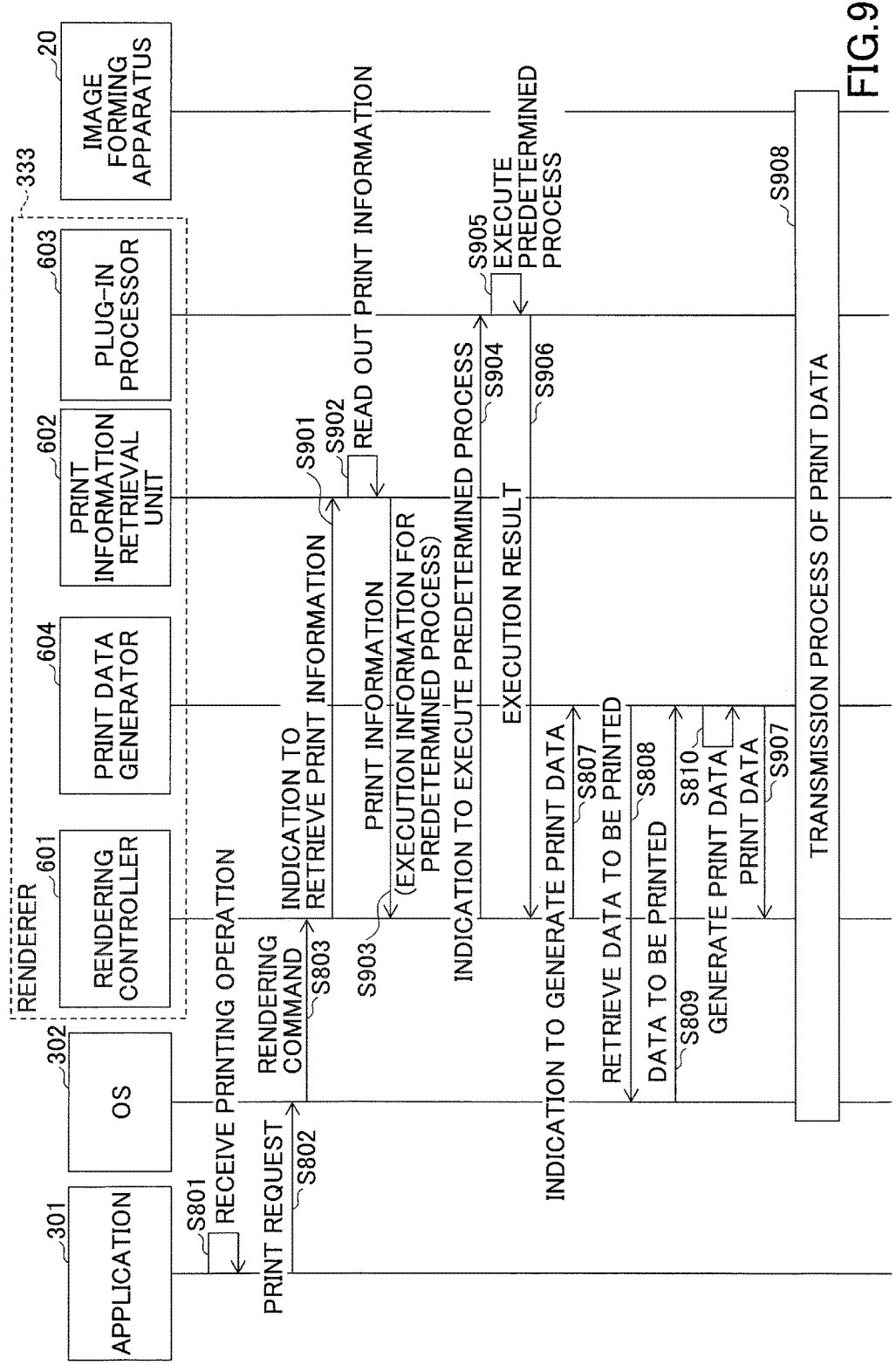
FIG. 9 is a sequence diagram illustrating another example of the process by the information processing system according to the embodiment.

FIG. 9 is a sequence diagram illustrating another example of the process by the system according to the embodiment. Here, as the processes of steps 801 through S803 and steps S807 through S810 of FIG. 9 are the same as the corresponding steps of FIG. 8, the difference from the process illustrated in FIG. 8 is mainly described here.

At step S901, upon receiving a rendering command transmitted from the OS 302, the rendering controller 601 indicates the print information retrieval unit 602 to retrieve the print information 611 including the execution information 612 for the predetermined process stored in the print information storage unit 610.

At step S902, the print information retrieval unit 602 reads out the print information 611 including the execution information 612 for the predetermined process stored in the print information storage unit 610. The print information 611 includes, for example, configuration information for printing stored by the application 301, the default configuration information of the printer driver 303, the information about the image forming apparatus 20, and the execution information 612 for the predetermined process.

At step S903, the print information retrieval unit 602 outputs the retrieved print information 611 to the rendering controller 601.

At step S904, the rendering controller 601 indicates the plug-in controller 603 to execute the predetermined process using the execution information 612 included in the retrieved print information 611.

At step S905, the plug-in processor 603 executes the predetermined process indicated by the rendering controller 601. After completing the predetermined process, the plug-in processor 603 transmits the execution result of the predetermined process to the rendering controller 601 at step S906.

In this manner, the plug-in processor 603 can be caused to execute the predetermined process at a timing that is different from the timing after the print data generator 604 generates the print data by controlling, by the rendering controller 601, execution of the predetermined process by the plug-in processor 603.

At steps S807 through S810, the rendering controller 601 causes the print data generator 604 to generate the print data; and at step S907, the rendering controller 601 retrieves the generated print data from the print data generator 604.

At step S908, for example, the process of transmitting the print data illustrated in steps S817 through S823 is executed.

<Details of the Process>

Next, the processing flow of the information processing method by the client device 10 and the information processing system 1 according to the embodiment is described in detail by exemplifying specific examples.

First Example

<Functional Configuration>

Figure 10:
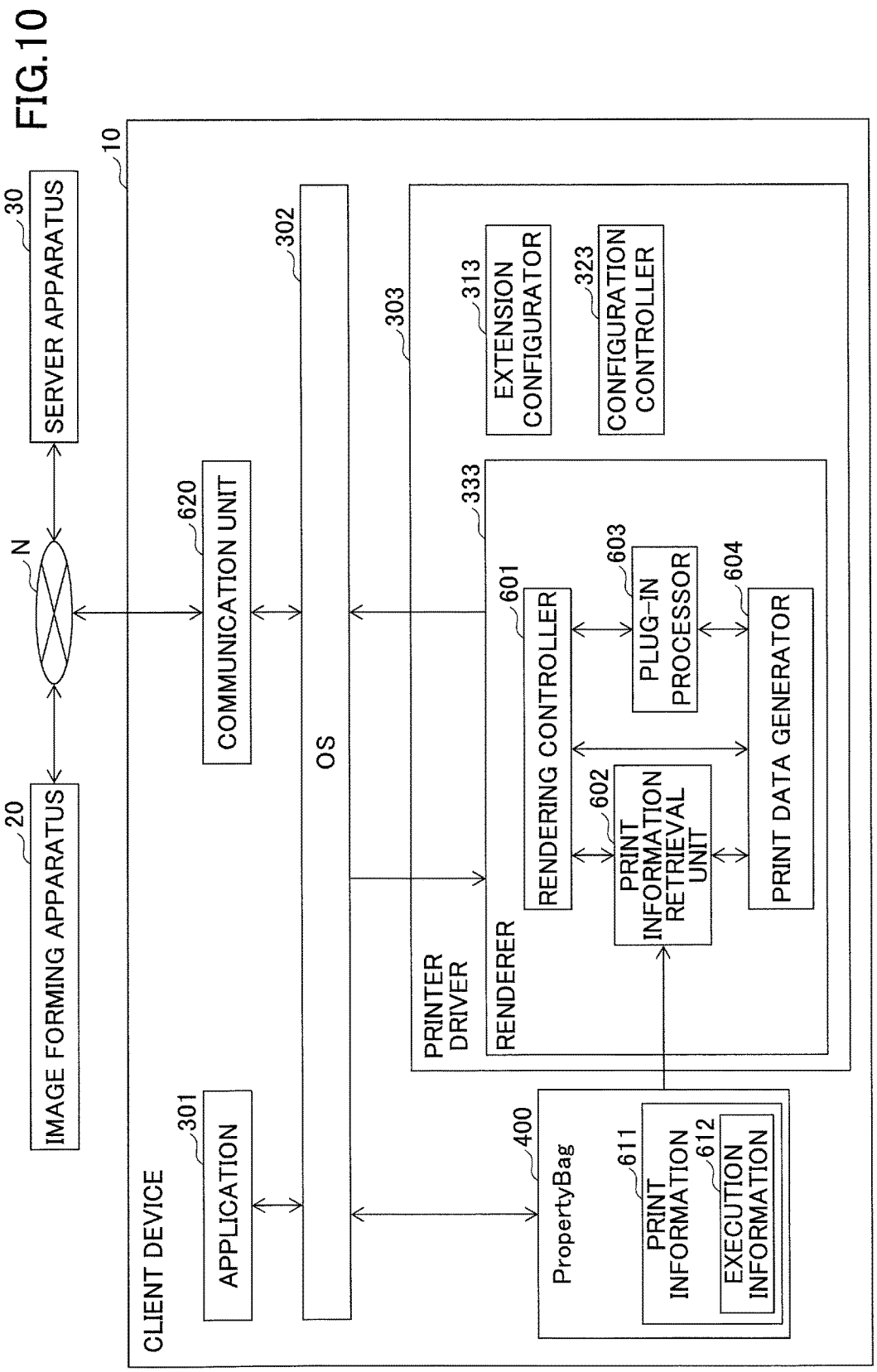
FIG. 10 is a diagram illustrating an example of a functional configuration of the client device according to a first example.

FIG. 10 is a diagram illustrating an example of a functional configuration of the client device 10 according to the first example. The client device 10 illustrated in FIG. 10 uses, as the print information storage unit 610 of the client device 10 illustrated in FIG. 6, the PropertyBag 400 described by referring to FIG. 5. The other part of the functional configuration are the same as the corresponding part of the client device 10 illustrated in FIG. 6.

In the first example, as an example of the predetermined process, it is assumed that the plug-in processor 603 includes, in advance, a function for transmitting the print data generated by the print data generator 604 to a predetermined path of the server apparatus 30, which is a file server of location-free printing.

Furthermore, it is assumed that the path information of the destination to which the print data is transmitted by the plug-in processor 603 is specified by the execution information 612 included in the print information.

Furthermore, it is assumed that the print information 611 is stored in the QueuePropertyBag 420 of the PropertyBag 400.

When the printer driver 303 is transferred to a client environment using a function provided by the OS 302 (e.g., a point and print function), in the QueuePropertyBag 420, the configuration information is also transferred. Accordingly, QueuePropertyBag 420 is preferable as the print information storage unit 610 for storing the print information 611.

<Details of the Process>

Figure 11:
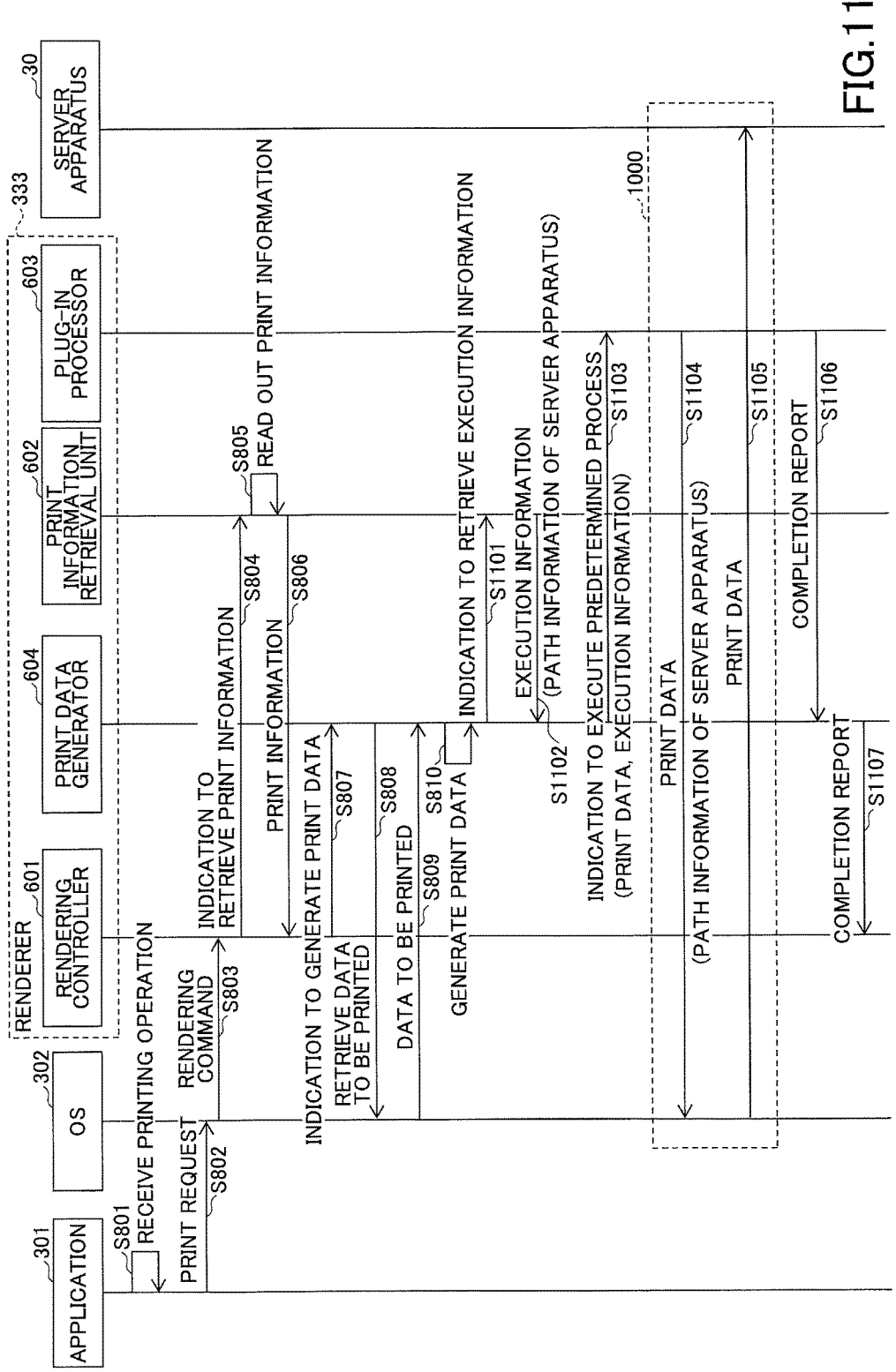
FIG. 11 is a sequence diagram illustrating an example of a process by the information processing system according to the first example.

FIG. 11 is a sequence diagram illustrating an example of a process by the information processing system according to the first example. The processes of steps S801 through S810 of FIG. 11 are the same as the processes illustrated in FIG. 8. Accordingly, the difference from the process illustrated in FIG. 8 is mainly described here.

At steps S1101 and S1102, the print data generator 604 retrieves the execution information 612 included in the print information 611 stored in the PropertyBag 400 using the print information retrieval unit 602. In the example, it is assumed that information indicating the path of a file storage destination to which the print data is transmitted by the plug-in processor 603 is included in the execution information 612. FIG. 12A illustrates an example of the execution information 612 included in the print information 611 according to the first example.

In the example of FIG. 12A, the execution information 612 is included in the print information 611 stored in the QueuePropertyBag 420. The execution information 612 defines a character string 1201 indicating the path of the file storage destination.

In this manner, the execution information 612 is stored in the print information 611 while associating a key 1202 for the execution information 612 with the character string that is the execution information.

Referring back to FIG. 11, the description of the sequence diagram is continued.

At step S1103, the print data generator 604 instructs the plug-in processor 603 to execute the predetermined process based on the retrieved execution information 612. The indication includes, for example, the print data and the execution information 612.

At steps S1104 and S1105, the plug-in processor 603 executes, as an example of a predetermined process 1000, a process 1000 for transmitting the print data generated by the print data generator 604 to the predetermined path of the server apparatus 30.

For example, at steps S1104 and S1105, the plug-in processor 603 transmits, via the OS 302, the print data to the server apparatus 30 in accordance with the path information of the server apparatus 30 included in the execution information 612.

Note that the process 1000 illustrated in FIG. 11 is an example of the predetermined process to be executed by the plug-in processor 603. The plug-in processor 603 may execute the predetermined process in accordance with the configuration information included in the execution information 612.

At steps S1106 and S1107, after completing execution of the predetermined process 1000, the plug-in processor 603 transmits a completion report indicating that the predetermined process has been completed to the print data generator 604 and the rendering controller 601.

Another Example

In the process illustrated in FIG. 11, the case is described in which the print information storage unit 610 is the QueuePropertyBag 420 of the PropertyBag 400.

Here, as another example, an example of a case is described in which the print information storage unit 610 is the PrintTicket that is the storage area for storing the print information 611. The PrintTicket is created for each printing (job) by the application 301.

<Functional Configuration>

Figure 13:
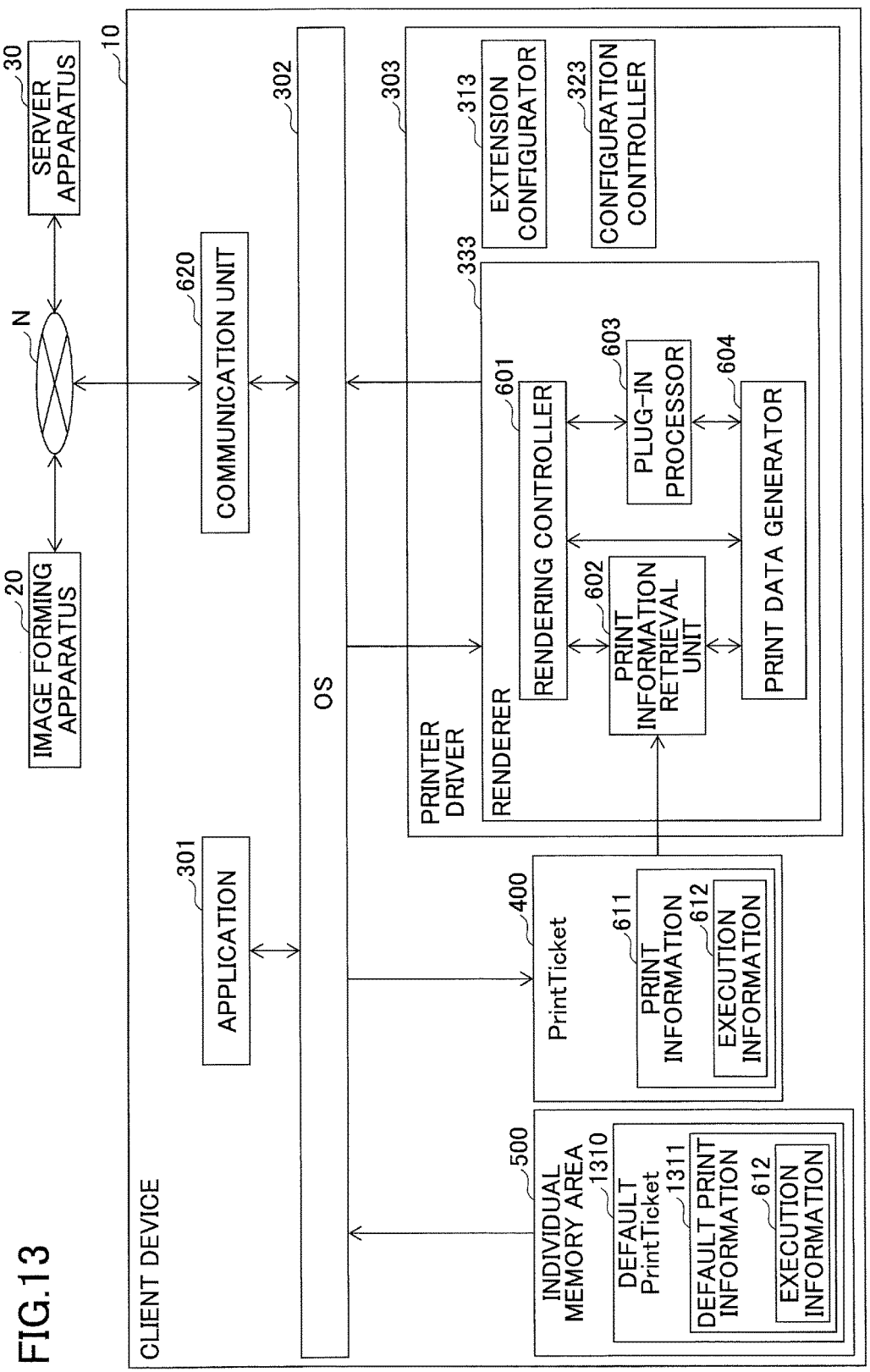
FIG. 13 is a diagram illustrating another example of the functional configuration of the client device according to the first example.

FIG. 13 is a diagram illustrating another example of a functional configuration of the client device 10 according to the first example. The client device 10 illustrated in FIG. 13 uses, as the print information storage unit 610 of the client device 10 illustrated in FIG. 6, the PrintTicket 1320.

In this case, for example, the default PrintTicket 1310 is stored, in advance, in the individual memory area 500 described by referring to FIG. 5. The individual memory area 500 can be accessed by the printer driver 303. The default PrintTicket 1310 includes default print information 1311 including the execution information 612.

Upon requesting printing, the application 301 creates the PrintTicket 1320 of the data to be printed using the default PrintTicket 1310 stored in the individual memory area 500. By this process, the execution information 612 stored in the individual memory area 500 is included in the PrintTicket 1320 generated for each printing by the application 301.

<Processing Flow>

Figure 14:
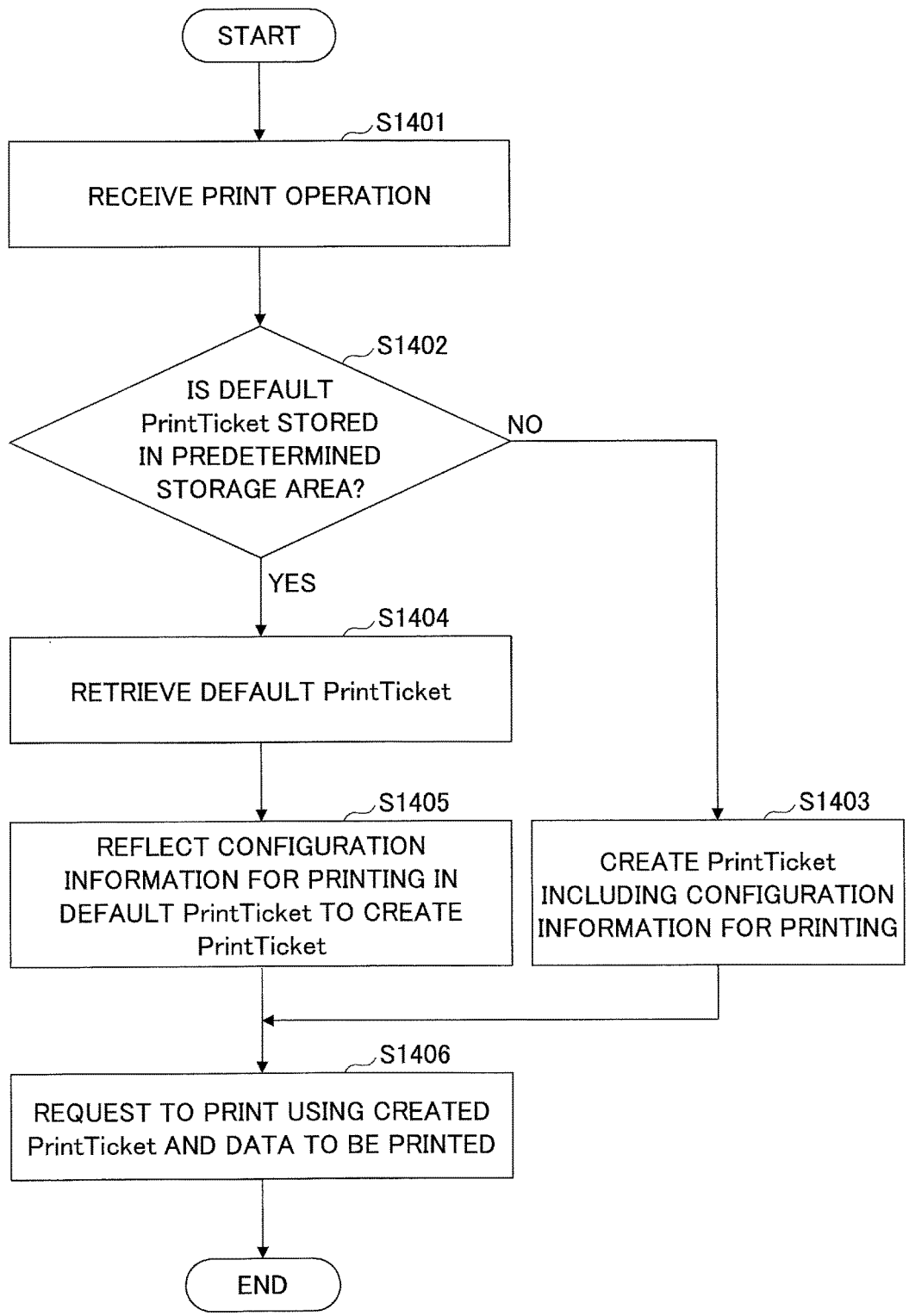
FIG. 14 is a flowchart illustrating an example of a print request process by an application according to the first example.

FIG. 14 is a flowchart illustrating an example of a print request process by the application according to the first example.

At step S1401, the application 301 receives, for example, a command for a print process by a user.

At step S1402, the application 301 determines whether the default PrintTicket 1301 is stored in the predetermined storage area (e.g., the individual memory area 500).

Upon detecting that the default PrintTicket 1310 is not stored in the predetermined storage area, the application 301 creates, at step S1403, the PrintTicket, which includes the configuration information for printing, used for printing the data to be printed, as usual.

In contrast, upon detecting that the default PrintTicket 1310 is stored in the predetermined storage area, the application 301 causes the process to proceed to step S1404.

After transitioning to step S1404, the application 301 retrieves the default PrintTicket 1301 from the predetermined storage area.

At step S1405, the application 301 updates the default PrintTicket 1310 to create PrintTicket 1320 used for printing the data to be printed so as to reflect the configuration information for printing.

At step S1406, the application 301 requests, using the data to be printed and the created PrintTicket 1320, the OS 302 to print.

In this example, the print information retrieval unit 602 may retrieve, at steps S1101 and S1102 of the sequence diagram illustrated in FIG. 11, the execution information 612 included in the print information 611 stored in the PrintTicket 1320. The other process is the same as the corresponding process of FIG. 11 described above. FIG. 12B illustrates another example of the execution information 612 included in the print information 611 according to the first example.

In the example of FIG. 12B, the execution information 612 in which the character string 1201 indicating the path of the file storage destination is defined is included in the print information 611 stored in the PrintTicket 1320.

As described above, according to the example, a destination of transmitting file by the plug-in processor 603 can be changed using the execution information 612 included in the print information 611 stored in the QueuePropertyBag 420 or the PrintTicket 1320.

Second Example

In the first example, the example of the case is described in which the plug-in processor 603 includes, in advance, the function for executing the predetermined process.

In the second example, an example of a case is described in which the plug-in processor 603 executes a process in accordance with a script language included in the execution information 612.

The script languages refer to the whole simplified programming languages for describing relatively simple programs. In general, a script language adopts an interpreter method, so that the script language can be executed by sequentially parsing the language.

In the example, it is assumed that the plug-in processor 603 includes a function for executing a program (which is referred to as a script, hereinafter) created by a script language.

Furthermore, in the example, it is assumed that a script described in a script language is stored in the execution information 612 included in the print information 611 stored in the print information storage unit 610.

<Processing Flow>

FIG. 15 is a sequence diagram illustrating an example of a process by the information processing system according to the second example. Note that the processes of steps S801 through S810 of FIG. 15 are the same as the corresponding processes illustrated in FIG. 8. Accordingly, the difference from the process illustrated in FIG. 8 is mainly described here.

At steps S1501 and S1502, the print data generator 604 retrieves the execution information 612 included in the print information 611 stored in the print information storage unit 610 using the print information retrieval unit 602. Note that, as the information storage unit 610, the PropertyBag 400 (e.g., the QueuePropertyBag 420) or the PrintTicket 1320 can be used, as described above.

FIGS. 16A, 16B, 17A, and 18B are diagrams illustrating examples of the execution information according to the second example.

Figure 16A:
FIG. 16A is a diagram illustrating an example of the execution information according to the second example.

FIG. 16A illustrates an example 1 of the execution information 612 included in the print information 611 according to the second example. In the example of FIG. 16A, the print information 611 stored in the QueuePropertyBag 420 (an example of the print information storage unit 610) includes the execution information 612 described in the script 1611 to be executed by the plug-in processor 603. In this manner, for example, the script 1611 to be executed by the plug-in processor 603 is described in the execution information 612 included in the print information 611.

FIG. 16B illustrates an example 2 of the execution information 612 included in the print information 611 according to the second example. In the example of FIG. 16B, reference information (link information) 1622 indicating the location from which the script 1611 to be executed by the plug-in processor 603 is obtained is described in the print information 611 stored in the QueuePropertyBag 420 (an example of the print information storage unit 610). In this manner, the execution information 612 included in the print information 611 may include the reference information indicating the location from which the script to be executed by the plug-in processor 603 is obtained.

FIG. 17A illustrates an example 3 of the execution information included in the print information 611 according to the second example. As illustrated in FIG. 17A, the print information storage unit 610 that stores the print information 611 including the execution information 612 may be the PrintTicket 1320. In this case, similarly, the execution information 612 includes a script to be executed by the plug-in processor 603 or reference information indicating a location from which the script to be executed by the plug-in processor 603 is obtained.

Here, as an example, it is assumed that a script for executing a process of transmitting the print data generated by the print data generator 604 to the predetermined path of the server apparatus 30 is stored in the execution information 612. However, this process is an example of the predetermined process. In this example, the plug-in processor 603 can be caused to execute various types of processes by changing the script stored in the execution information 612.

Referring back to FIG. 15, the description of the sequence diagram is continued.

At step S1503, the print data generator 604 indicates the plug-in processor 603 to execute the predetermined process based on the retrieved execution information 612. The indication includes, for example, the print data and the execution information 612 (script).

At steps S1504 and S1505, the plug-in processor 603 executes the script for implementing a predetermined process 1500 included in the execution information 612 transmitted from the print data generator 604. Here, the plug-in processor 603 executes, as an example of the predetermined process 1500, a process of transmitting the print data generated by the print data generating unit 604 to the predetermined path of the server apparatus 30.

For example, at steps S1504 and S1505, the plug-in processor 603 transmits the print data to the sever apparatus 30 via the OS 302 by executing the script. Note that the path information of the server apparatus 30 is described, for example, in the script.

Note that the predetermined process illustrated in FIG. 15 is merely an example. The plug-in processor 603 may execute the script described in the execution information 612 or the script retrieved from the destination of the link indicated in the execution information 612.

For example, after completing execution of the predetermined process 1500, at steps S1506 and S1507, the plug-in processor 603 transmits, to the print data generator 604 and the rendering controller 601, a completion report indicating that the predetermined process has been completed.

By the above-described process, the renderer 333 of the printer driver 303 becomes capable of executing various processes based on the execution information 612 included in the print information 611 stored in the print information storage unit 610.

In the above-described description, the plug-in processor 603 executes the script. As a modified example, the plug-in processor 603 may retrieve, based on the reference information described in the execution information 612, a file to be executed, such as an Executable (EXE) file, to execute the file.

FIG. 17B illustrates an example 4 of the execution information according to the second example. In the example of FIG. 17B, the reference information 1711 indicating the path of the location from which the executable file to be executed by the plug-in processor 603 is retrieved is described in the print information 611 stored in the print information storage unit 610.

The plug-in processor 603 retrieves the executable file from the path indicated in the reference information 1711, and the plug-in processor 603 executes the executable file.

As described above, according to this example, the printer driver 303 can be caused to execute various types of processes by storing a script for implementing a predetermined process or reference information in the execution information 612 included in the print information 611 stored in the print information storage unit 610.

Third Example

In the first and second examples, the process of transmitting the print data to the server apparatus 30 is described, as the example of the process to be executed by the plug-in processor 603. In the third example, an example of a case where the plug-in processor 603 executes a process of previewing the print data is described, as another example of the process to be executed by the plug-in processor 603.

Note that, in this example, it is assumed that the plug-in processor 603 is provided with a function for executing a script created with a script language, similar to the second example.

Furthermore, in the following description, it is assumed that a script for executing the process of previewing the print data generated by the print data generator 604 is described in the execution information 612.

<Processing Flow>
(Process by the Information Processing System)

Figure 18:
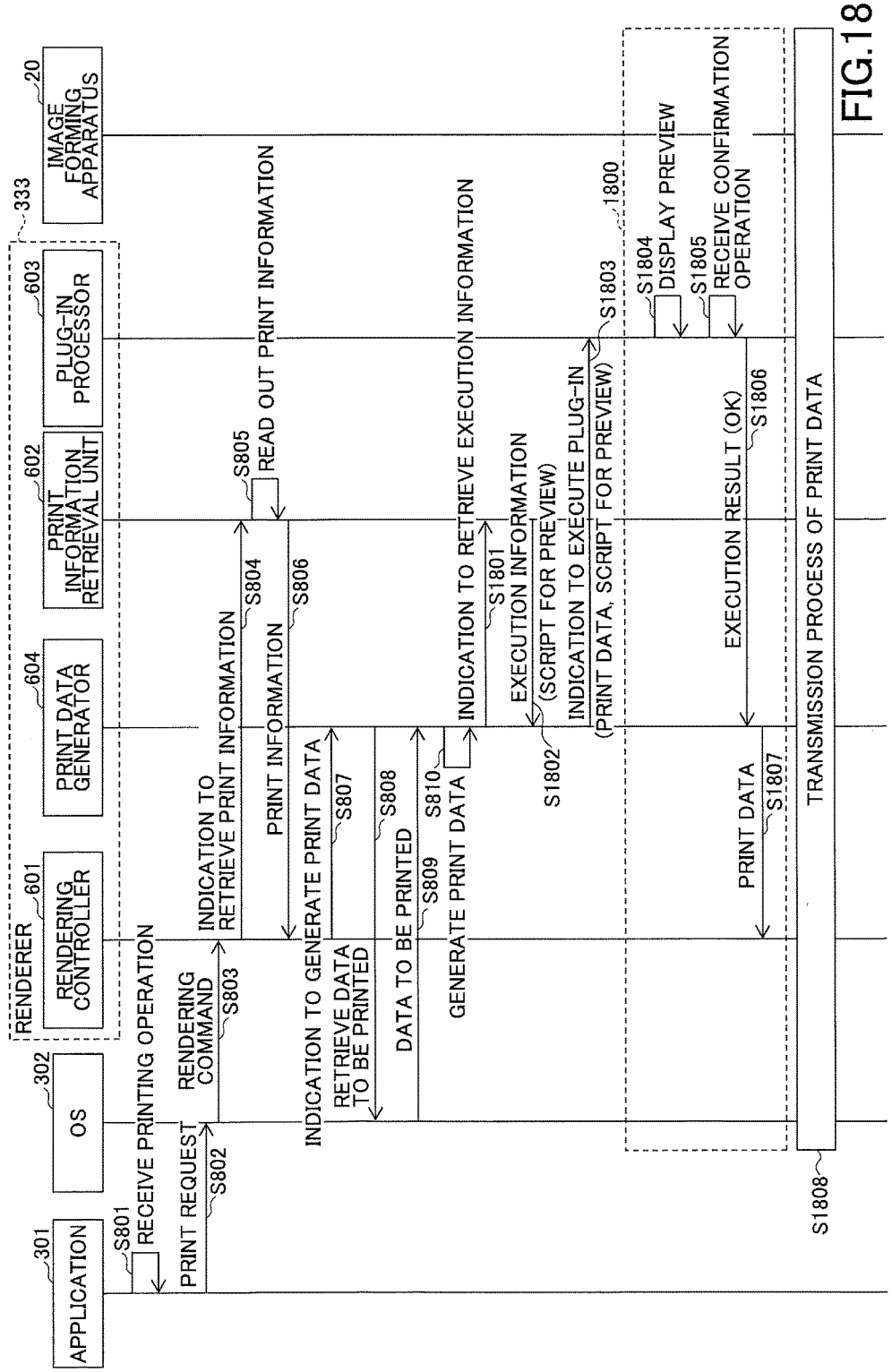
FIG. 18 is a sequence diagram illustrating an example of the process by the information processing system according to a third example.

FIG. 18 is a diagram illustrating an example of a process by the information processing system according to the third example. Note that the processes of steps S801 through S810 of FIG. 18 are the same as the corresponding processes illustrated in FIG. 8. Accordingly, the difference from the process illustrated in FIG. 8 is mainly described here.

Furthermore, the process other than the process of executing, by the plug-in processor 603, the description contents of the script 1611 described in the execution information 612 is the same as the corresponding process of the second example. Accordingly, the detailed description is omitted.

At steps S1801 and S1802, the print data generator 604 retrieves the execution information 612 included in the print information 611 stored in the print information storage unit 610 using the print information retrieval unit 602. Note that, in the example, the script for previewing the print data is described in the execution information 612, as the script 1611 to be executed by the plug-in processor 603.

At step S1803, the print data generator 604 indicates the plug-in processor 603 to execute the predetermined process based on the retrieved execution information 612. The indication includes, for example, the print data and the execution information 612 (the script for previewing).

Subsequently, the plug-in processor 603 executes a print data preview process 1800 by executing the script for previewing, which is included in the execution information 612 reported from the print data generator 604.

For example, at step S1804, the plug-in processor 603 causes the display device 102 to display the print data for preview, using the extension configurator 313, the configuration controller 323, or the application program interface (API) of the OS 302.

Upon receiving, at step S1805, a confirmation operation of a user, the plug-in processor 603 transmits the execution result (OK) to the print data generator 604 at step S1806.

Upon receiving the execution result (OK) from the plug-in processor 603, the print data generator 604 outputs the generated print data to the rendering controller 601 at step S1807.

At step S1808, the process of transmitting the print data, such as the process illustrated in steps S817 through S823 of FIG. 8, is executed.

(Print Data Generating Process)

Figure 19:
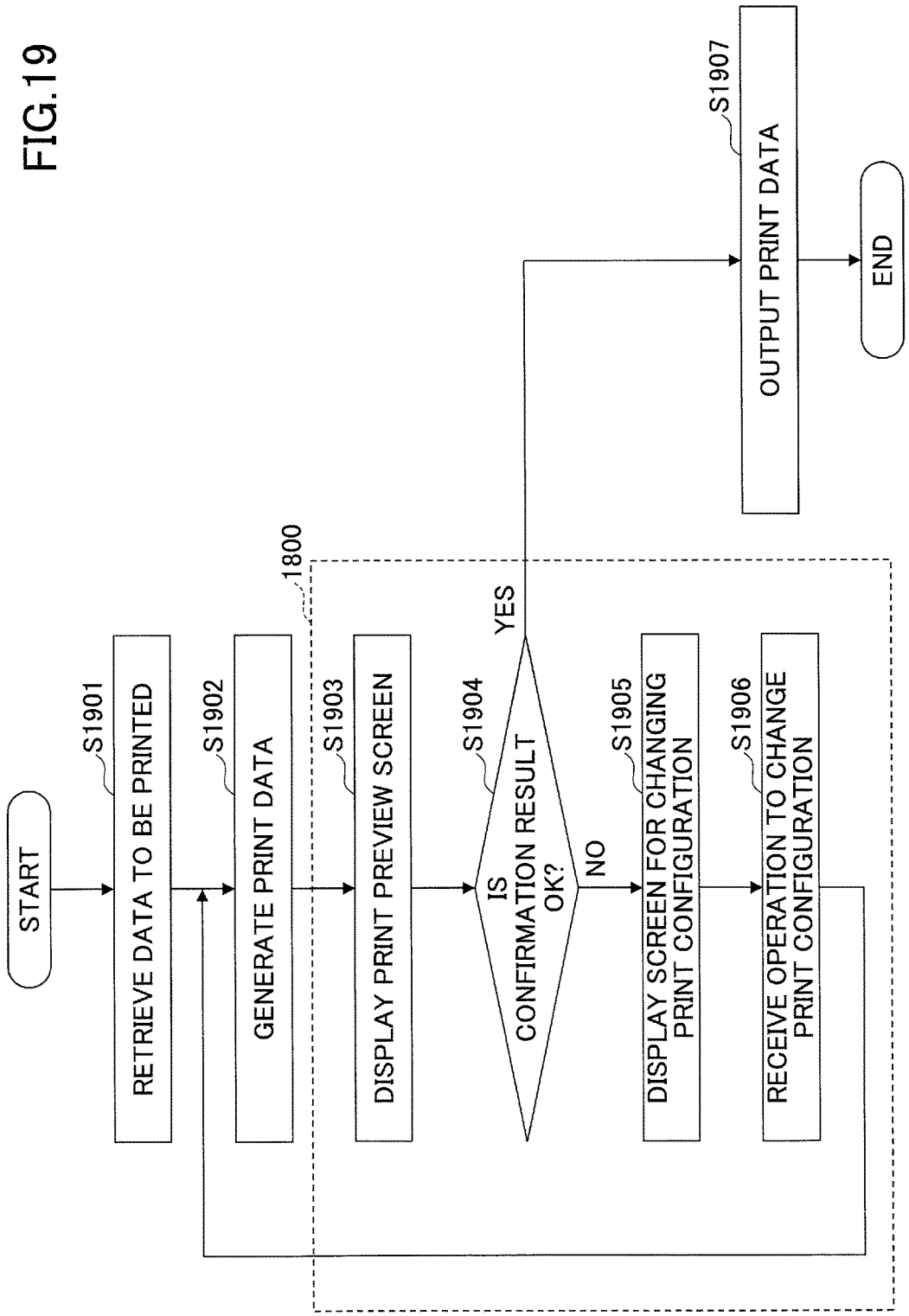
FIG. 19 is a flowchart illustrating an example of a process of generating print data according to a fourth example.

FIG. 19 is a flowchart illustrating an example of the process of generating the print data according to the fourth example. This process illustrates an example of a process for changing the print configuration after displaying the print data for preview, in the process of generating the print data executed in steps S807 through S809 and S1801 through S1807 of FIG. 18.

At step S1901, the print data generator 604 retrieves the data to be printed. This process corresponds, for example, to the process at steps S808 and S809 of FIG. 18.

At step S1902, the print data generator 604 generates the print data by converting the data to be printed into the print data that can be printed by the image forming apparatus 20. This process corresponds, for example, to the process at step S810 of FIG. 18.

At step S1903, the plug-in processor 603 causes the display device 102 to display the print preview screen indicating an image of the generated print data after printing.

At step S1904, upon detecting that a result of confirming the displayed print preview screen received from a user is "OK," the plug-in processor 603 causes the process to proceed to step S1907. However, upon detecting that a result received from a user is not "OK," the plug-in processor 603 causes the process to proceed to step S1905.

After transitioning to step S1905, the plug-in processor 603 causes the display device 102 to display a screen for changing the print configuration.

Upon receiving, at step S1906, an operation to change the print configuration by a user, the plug-in processor 603 reflects the received change in the print configuration information, and the plug-in processor 603 returns the process to step S1902.

Note that the above-described process of steps S1903 through S1905 corresponds, for example, to the print data preview process 1800 of FIG. 18.

After transitioning to step S1907, the print data generator 604 outputs the generated print data to the rendering controller 601, for example.

By the above-described process, a user of the client device 10 can confirm the preview screen of the print data, and, depending on necessity, the user can change the print configuration information.

In this manner, the printer driver 303 according to the example can execute various types of processes depending on the script or the reference information stored in the print information storage unit 610.

According to the above-described examples, in the V4 printer driver or a printer driver with a similar restriction, an original extension function can be easily added to the printer driver, while maintaining user's convenience.

<Functional Configuration>

(Functional Configuration of the Client Device)

Figure 20:
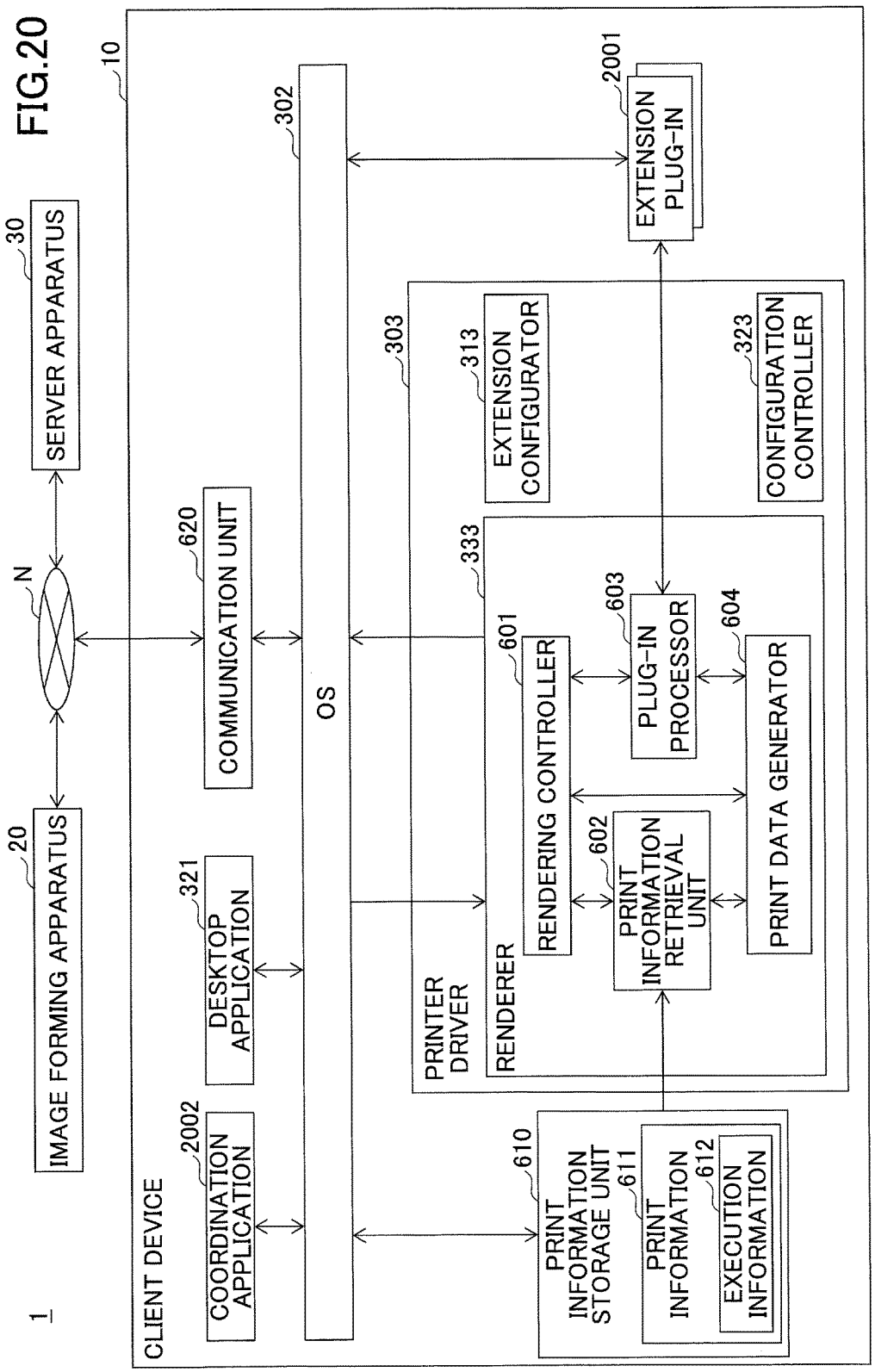
FIG. 20 is a functional configuration diagram of a client device according to a fifth example.

FIG. 20 is a functional configuration diagram of the client device according to the fifth example. The client device 10 according to the fifth example illustrated in FIG. 20 includes, in addition to the functional configuration of the client device 10 according to the embodiment illustrated in FIG. 6, one or more extension plug-ins 2001 and a coordination application 2002.

The extension plug-in 2001 is implemented, for example, by a program executed by the CPU 106 of FIG. 2, such as a Dynamic Link Library (DLL) or an executable file. The extension plug-in 2001 executes various types of extension functions, such as a function of changing the print data, a function of reading out the print data, or a function of transferring the print data, in accordance with the control by the plug-in processor 603 of the renderer 333.

The coordination application 2002 is executed, for example, by the CPU 106 of FIG. 2. The coordination application 2002 stores information for executing the extension function using the extension plug-in 2001 in the print information storage unit 610, as the execution information 612. For example, when the coordination application 2002 is installed in the client device 10, the coordination application 2002 locates (copies) one or more extension plug-ins 2001 in a program area (e.g., "C:¥ProgramFiles¥") of the client device 10. Furthermore, the coordination application 2002 stores, in the print information storage unit 610, the execution information 612 including path information indicating the location at which the one or more extension plug-ins 2001 are located and a plug-in name. Here, the one or more extension plug-ins 2002 are located in the program area.

The print information storage unit 610 is implemented, for example, by the individual memory area 500 or the QueuePropertyBag 420 of FIG. 5. The print information storage unit 612 stores the execution information 612 for the one or more extension plug-ins 2001. For example, a registry HKEY_LOCAL_MACHINE (HKLM) used in a usual Windows application may be used as an example of the individual memory area 500. Note that, other than the individual memory area 500, the print information storage unit 610 may be implemented by a memory area for each logical printer (e.g., QueuePropertyBag 420), in which information is transferred by the point and print function of the OS 302.

In response to detecting that the print information 611 stored in the print information storage unit 610 includes the execution information 612, the plug-in processor (processing unit) 603 according to the example executes the predetermined process by invoking the one or more extension plug-ins 2001 in accordance with the execution information 612.

Note that the functional configuration of the client device 10 according to this example may be, for example, the same as the functional configuration of the client device 10 according to the embodiment, which is illustrated in FIG. 6, except for the above-described functional configuration.

Figure 21:
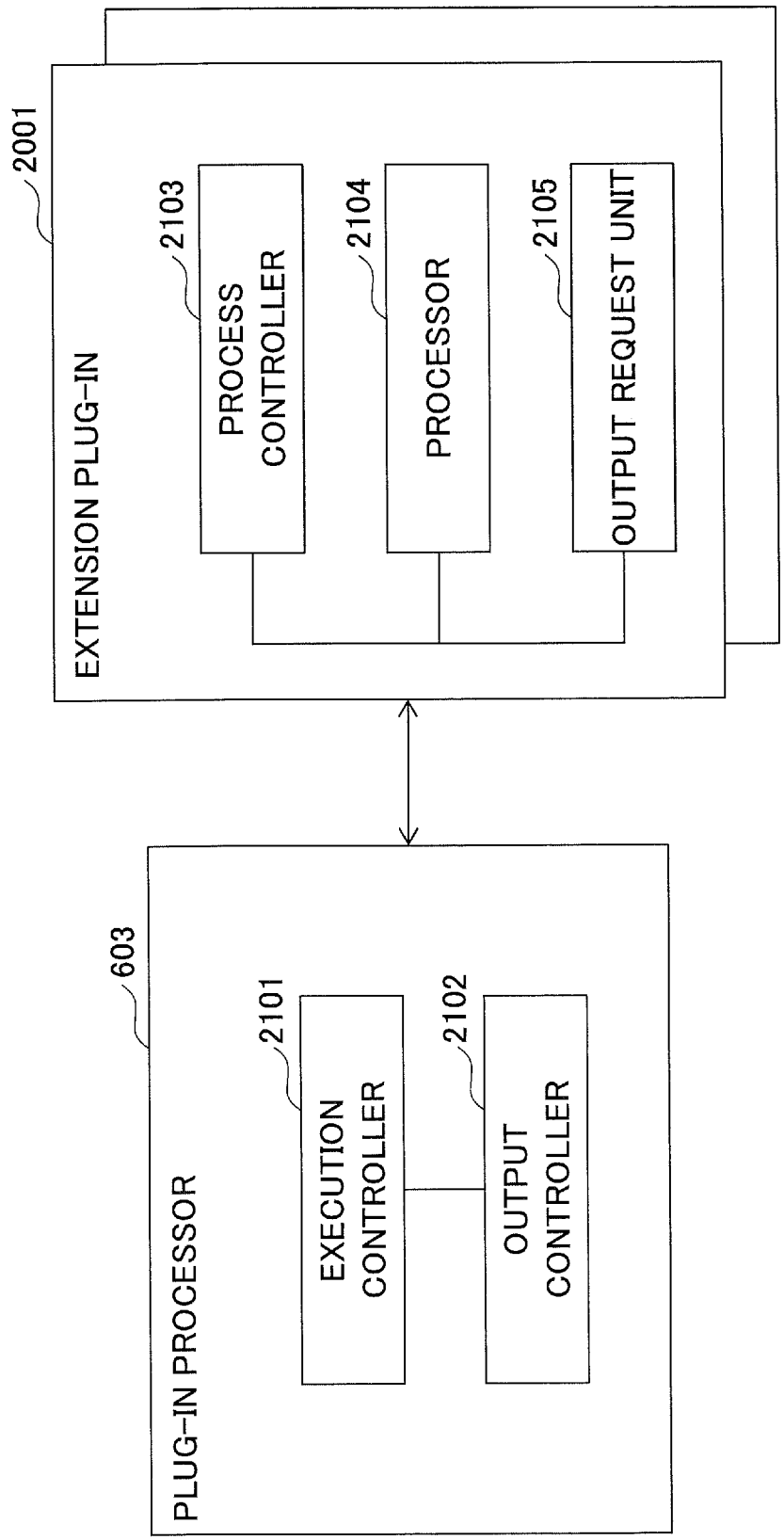
FIG. 21 is a functional configuration diagram of a plug-in processor and an extended plug-in according to the fifth example.

FIG. 21 is a functional configuration diagram of the plug-in processor 603 and the extension plug-in 2001 according to the fifth example.

(Functional Configuration of the Plug-in Processor)

The plug-in processor (processing unit) 603 includes an execution controller 2101. Furthermore, the plug-in processor 603 preferably includes an output controller 2102.

In response to detecting that the execution information 612 is stored in the print information storage unit 610, the execution controller 2101 invokes one or more extension plug-ins in accordance with the execution information 612 to control execution of the extension function implemented by the extension plug-in 2001.

Upon receiving an output request (print request) including the print data from the one or more extension plug-ins 2001, the output controller 2102 outputs the print data to the image forming apparatus 20. For example, the output controller 2102 outputs the received print data to the spooler of the OS 302.

As described above, the plug-in processor 603 may be provided with an interface (the output controller 2102) with respect to the extension plug-in 2001. The interface is for receiving a request for outputting the print data.

(Functional Configuration of the Extension Plug-in)

The extension plug-in 2001 includes, for example, a process controller 2103 and a processor 2104. Furthermore, the extension plug-in 2001 preferable includes an output request unit 2105.

The processor 2104 executes a predetermined process (extension function) in accordance with control by the process controller 2103. Note that the predetermined process includes, for example, a change process for adding a change to the print data, a reading process for reading out information from the print data, a transfer process for transferring the print data, or an authentication process.

The process controller 2103 receives a processing request from the plug-in processor 603 of the renderer 333, and the process controller 2103 causes the processor 2104 to execute a process in accordance with the received processing request.

When the print data to which a process (e.g., a changing process) is applied by the process controller 2103 is to be output to the image forming apparatus 20, the output request unit 2105 requests the output controller 2102 of the plug-in processor 603 to output the print data.

As described above, the extension plug-in 2001 may request the renderer 333 to output the print data.

Note that, for example, if it is not necessary to output the print data from the client device 10 to the image forming apparatus 20, such as a case where the process of transferring the print data is executed by the extension plug-in 2001, the extension plug-in 2001 reports completion of the process without issuing the output request.

<Processing Flow>

Figure 22:
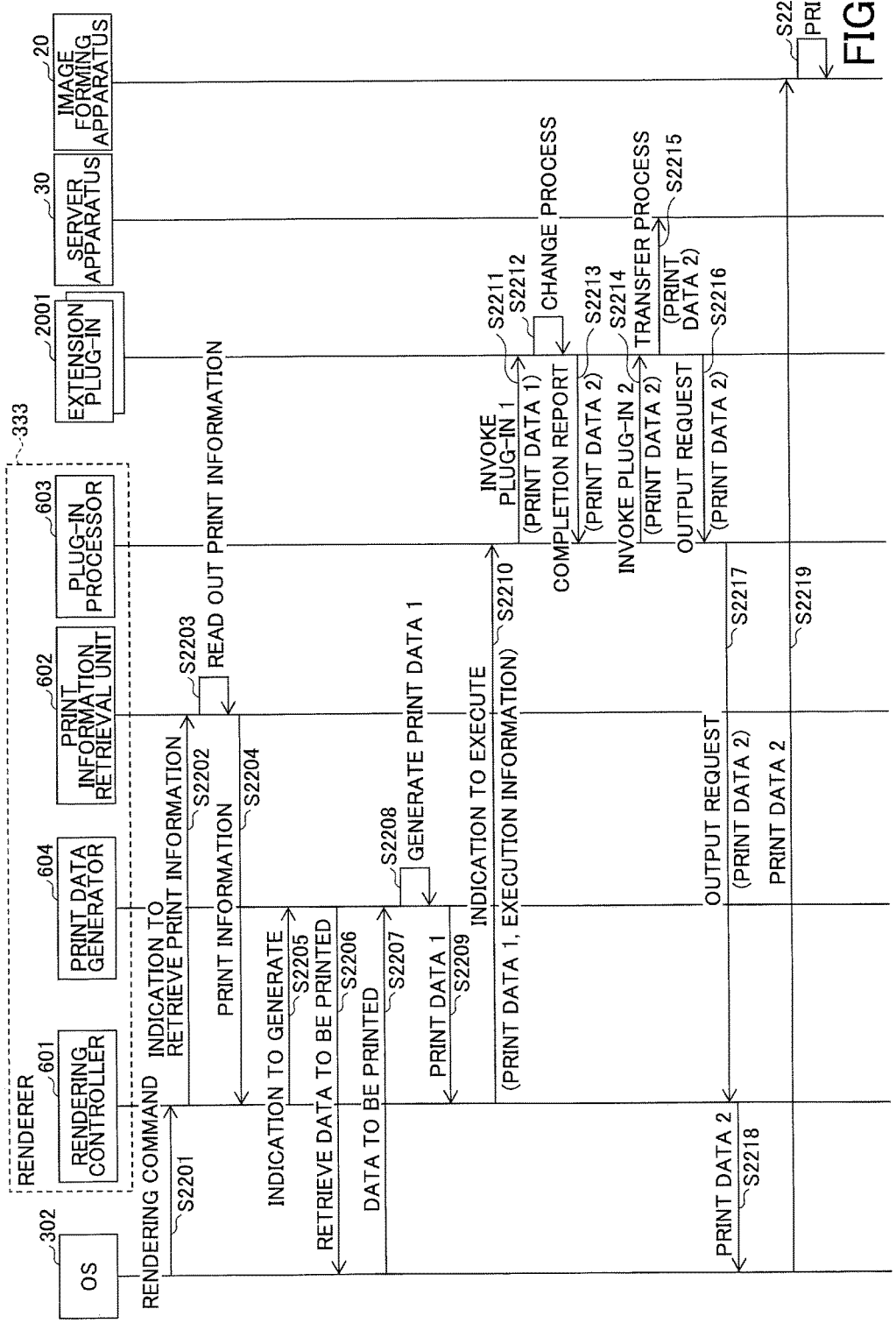
FIG. 22 is a sequence diagram illustrating an example of the process by the information processing system according to the fifth example.

FIG. 22 is a sequence diagram illustrating an example of the process by the information processing system according to the fifth example. Note that the processes respectively executed by the OS 302, the rendering controller 601, the print data generator 604, and the print information retrieval unit 602 are the same as the processes of the first through fourth examples, so that detailed descriptions are omitted here.

At step S2201, for example, in response to a print request from the desk top application 321, the OS 302 transmits, to the printer driver 303, a rendering command for indicating to render the data to be printed (to generate the print data).

Note that the rendering command transmitted to the printer driver 303 is received by the rendering controller 601 of the renderer 333.

At step S2202, upon receiving the rendering command transmitted from the OS 302, the rendering controller 601 indicates the print information retrieval unit 602 to retrieve the print information 611.

At step S2203, the print information retrieval unit 602 reads out the print information 611 stored in the print information storage unit 610. Here, it is assumed that the print information 611 includes the execution information for the process to be executed by the one or more extension plug-ins 2001, which are stored by the coordination application 2002.

At step S2204, the print information retrieval unit 602 transmits the retrieved print information 611 to the rendering controller 601.

At step S2205, the rendering controller 601 indicates the print data generator 604 to generate the print data.

At steps S2206 and S2207, the print data generator 604 retrieves the data to be printed from the spooler of the OS 302 storing the data to be printed.

At step S2208, the print data generator 604 generates print data 1 by converting the data to be printed into the print data that can be printed by the image forming apparatus 20.

At step S2209, the print data generator 604 transmits the generated print data 1 to the rendering controller 601.

At step S2210, the rendering controller 601 transmits, to the plug-in processor 603, an indication to execute including the print data 1 retrieved at step S2209 and the execution information 612 included in the print information 611 retrieved at step S2204.

At steps S2211 through S2216, the plug-in processor 603 invokes the one or more extension plug-ins 2001 in accordance with the execution information 612 included in the indication to execute, and the plug-in processor 603 causes the one or more execution plug-ins 2001 to execute the process.

FIG. 23 illustrates an example of the execution information 612. In the example of FIG. 23, the execution information 2300 is defined by an array 2301 including a first extension plug-in 2302 and a second extension plug-in 2303. Each plug-in includes an information element, such as "name," "path," and "ReadOnly."

The information element "name" is information indicating a name of the plug-in (a plug-in name). The information element "path" is path information for accessing each plug-in. The information element "ReadOnly" is information indicating whether the plug-in is provided with a read-only attribute (true) or the plug-in is not provided with the read-only attribute (false).

Note that the execution information 2300 illustrated in FIG. 23 is an example of the execution information 612 stored in the print information storage unit 610. It suffices if the execution information 612 includes information for invoking the one or more extension plug-ins 2001.

The plug-in processor 603 causes each of the one or more extension plug-ins 2001 to execute the process, for example, by sequentially invoking the one or more the extension plug-ins 2001 in accordance with the path information included in the execution information 612.

For example, at step S2211 of FIG. 22, the execution controller 2101 of the plug-in processor 603 invokes the plug-in 1, which is the first extension plug-in, and the execution controller 2101 transmits the print data 1 to the plug-in 1. At this time, the plug-in processor 603 also transmits, to the extension plug-in 2001 (the plug-in 1), information, such as a logical printer name, which is the information for identifying a request source of the process, and a job ID.

At step S2212, the process controller 2103 of the plug-in 1 causes the processor 2104 to execute a predetermined process (e.g., a changing process for changing the print data 1 from color data to monochrome data).

At step S2213, the process controller 2103 of the plug-in 1 transmits, to the plug-in processor 603, a completion report including print data 2 to which the changing process has been applied.

At step S2214, the execution controller 2101 of the plug-in processor 603 invokes the plug-in 2, which is the second extension plug-in, and the execution controller 2101 transmits the print data 2 to the plug-in 2.

At steps S2215 and S2216, the process controller 2103 of the plug-in 2 causes the processor 2104 and the output request unit 2105 to execute a predetermined process (e.g., a process of transferring the print data 2 to the server apparatus 30 and outputting the print data 2 to the image forming apparatus 20).

As a result, for example, at step S2215, the processor 2104 of the plug-in 2 executes a process of transferring the print data 2 to the server apparatus 30. Furthermore, at step S2216, the output request unit 2105 of the plug-in 2 requests the renderer 333 to output (print) the print data 2.

Upon receiving the request for outputting the print data 2 from the extension plug-in 2001, the output controller 2102 of the plug-in processor 603 transmits, at step S2217, the request for outputting the print data 2 to the rendering controller 601.

At steps S2218 and S2219, the rendering controller 601 of the renderer 333 transmits, to the image forming apparatus 20, the print data 2 via the OS 302.

At step S2220, the image forming apparatus 20 executes printing of the received print data 2.

By the above-described process, the printer driver 303 can invoke one or more extension plug-ins 2001 located outside the printer driver 303, and the printer driver 303 can cause the one or more plug-ins 2001 to execute the extended function. Furthermore, as the printer driver 303 is provided with an interface for receiving the output of the print data from the extension plug-in 2001, the printer driver 303 can cause the extension plug-in 2001 to execute the extended function that requires to output the print data.

Sixth Example

Figure 24:
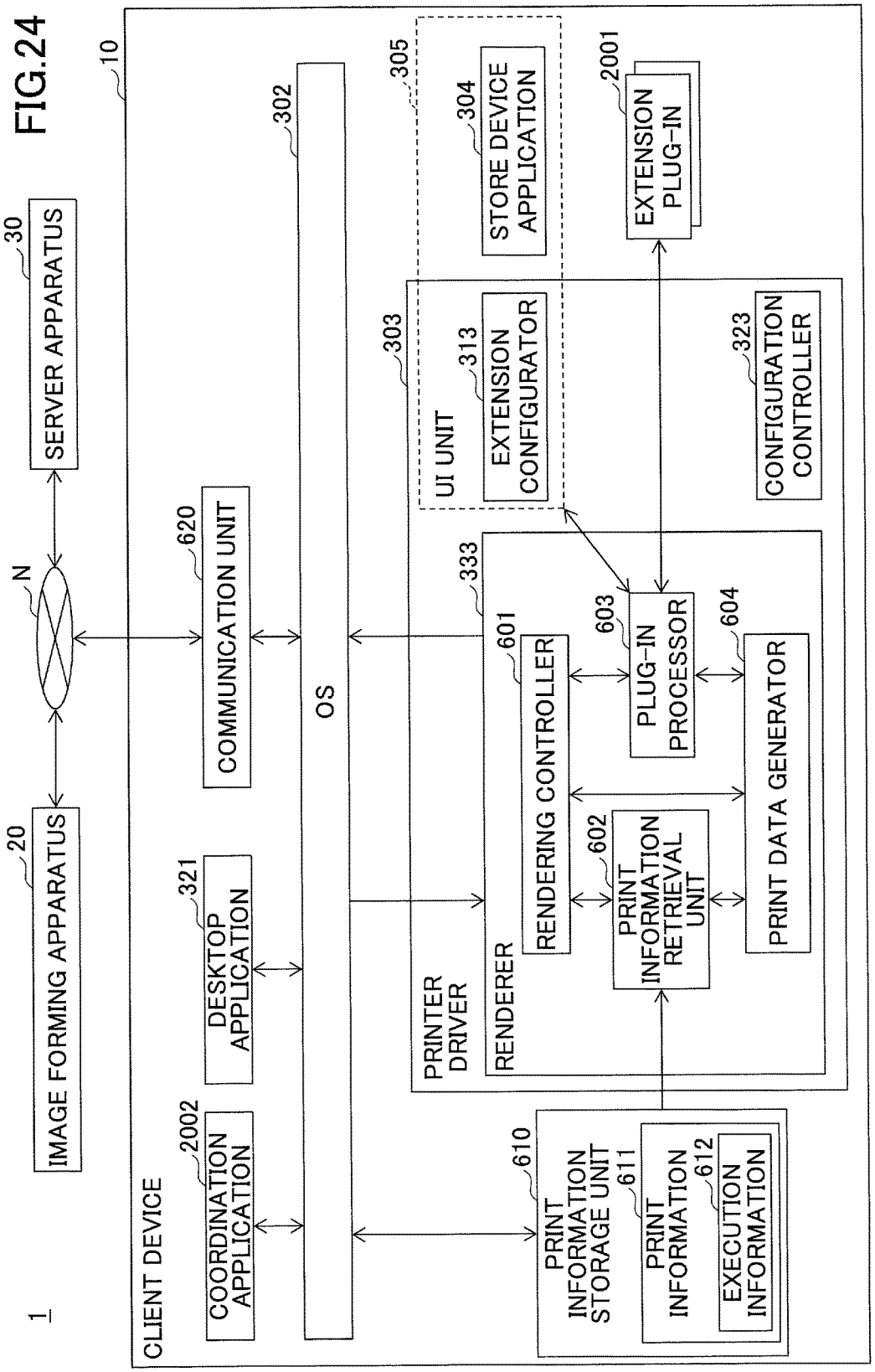
FIG. 24 is a functional configuration diagram of the client device according to a sixth example.

<Functional Configuration>
[Functional Configuration of the Client Device]
FIG. 24 is a functional configuration diagram of the client device according to the sixth example. In the client device 10 according to the sixth example illustrated in FIG. 24, in addition to the functional configuration of the client device 10 according to the fifth example illustrated in FIG. 20, a UI unit 305 is depicted. The UI unit 305 corresponds to the UI unit 305 illustrated in FIG. 4. The UI unit 305 includes the extension configurator 313 and the store device application 304.

The UI unit 305 according to this example causes the display device 102 to display a display screen (UI), such as a configuration screen or an authentication screen, in accordance with a request for displaying the UI from the plug-in processor 603, so that the UI unit 305 can receive an input operation by a user. Note that the UI unit 305 may be implemented by an application (executable file) that is different from the extension configurator 313 and the store device application 304.

Figure 25:
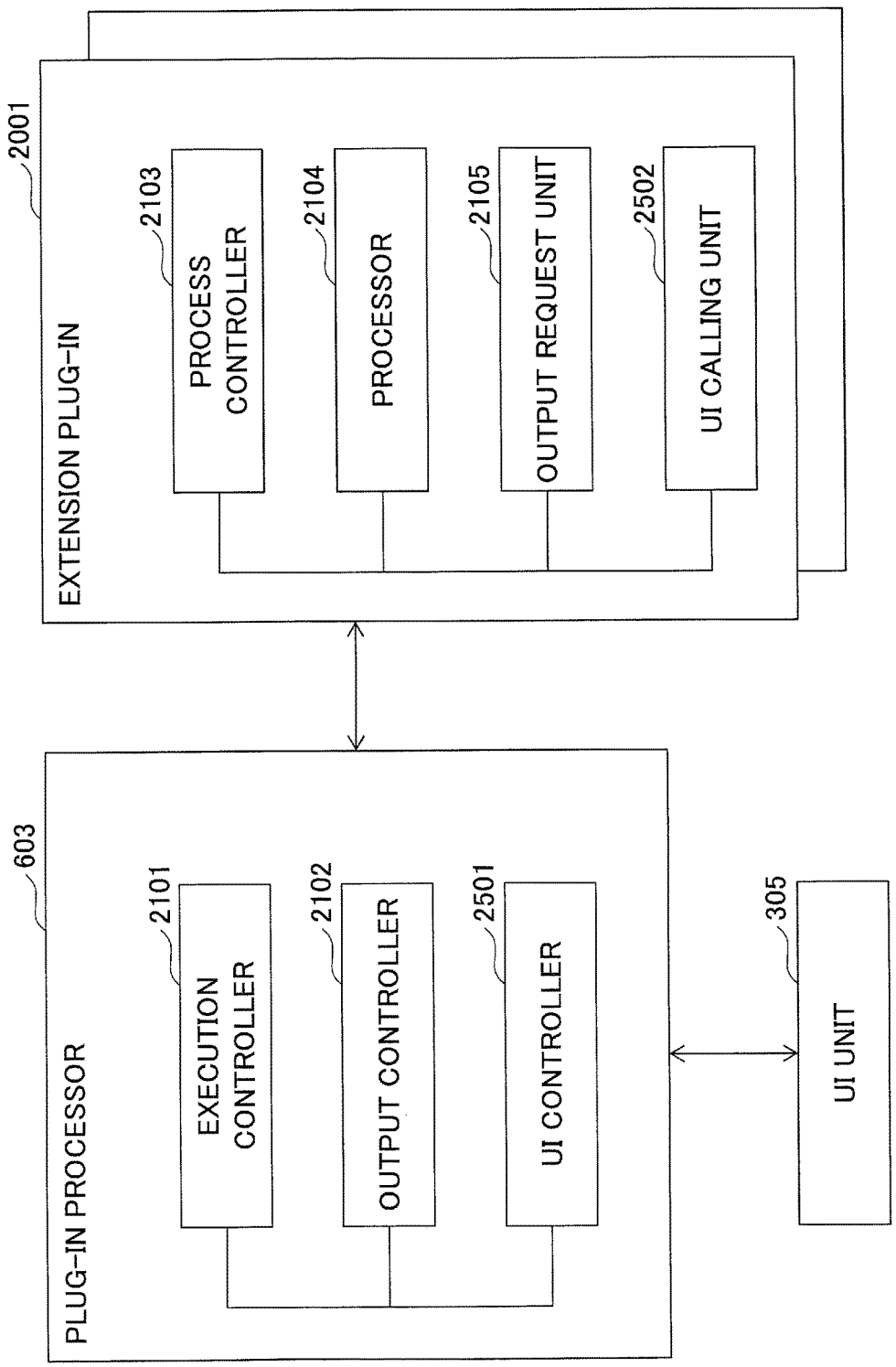
FIG. 25 is a functional configuration diagram of the plug-in processor and the extended plug-in according to a sixth example.

FIG. 25 is a functional configuration diagram of the plug-in processor 603 and the extension plug-in 2001 according to the sixth example.
(Functional Configuration of the Plug-in Processor)
The plug-in processor 603 according to the sixth example illustrated in FIG. 25 includes, in addition to the functional configuration of the plug-in processor 603 according to the fifth example illustrated in FIG. 20, a UI controller 2501.

Upon receiving a UI display request for requesting to display the UI (user interface) from the extension plug-in 2001, the UI controller 2501 causes the UI unit 305 to display a display screen (UI), such as the configuration screen or the authentication screen, using the UI information included in the UI display request. Furthermore, the UI controller 2501 transmits the input data received by the UI unit 305 to the extension plug-in 2001, which is the request source.

As described above, the plug-in processor 603 preferably includes an interface (the UI controller 2501) with respect to the extension plug-in 2001. The interface is for receiving a request for displaying the UI. When the plug-in processor 603 includes the UI controller 2501, it is not necessary to prepare a UI display function for displaying the UI in each of the extension plug-ins 2001, and it can be prevented that multiple displaying processes are executed in a single printing process. Here, a UI display function is an executable file for activating a screen of the UI.
(Functional Configuration of the Extension Plug-in)
The extension plug-in 2001 according to the sixth example illustrated in FIG. 25 includes, in addition to the functional configuration of the extension plug-in 2001 according to the fifth example illustrated in FIG. 20, a UI calling unit 2502.

Upon detecting that it is necessary to display the UI from the extension plug-in 2001, the UI calling unit 2502 requests the UI controller 2501 of the plug-in processor 603 to display the UI. In this manner, the extension plug-in 2001 can request to display the UI using the UI controller 2501 of the plug-in processor 604.

Figure 26:
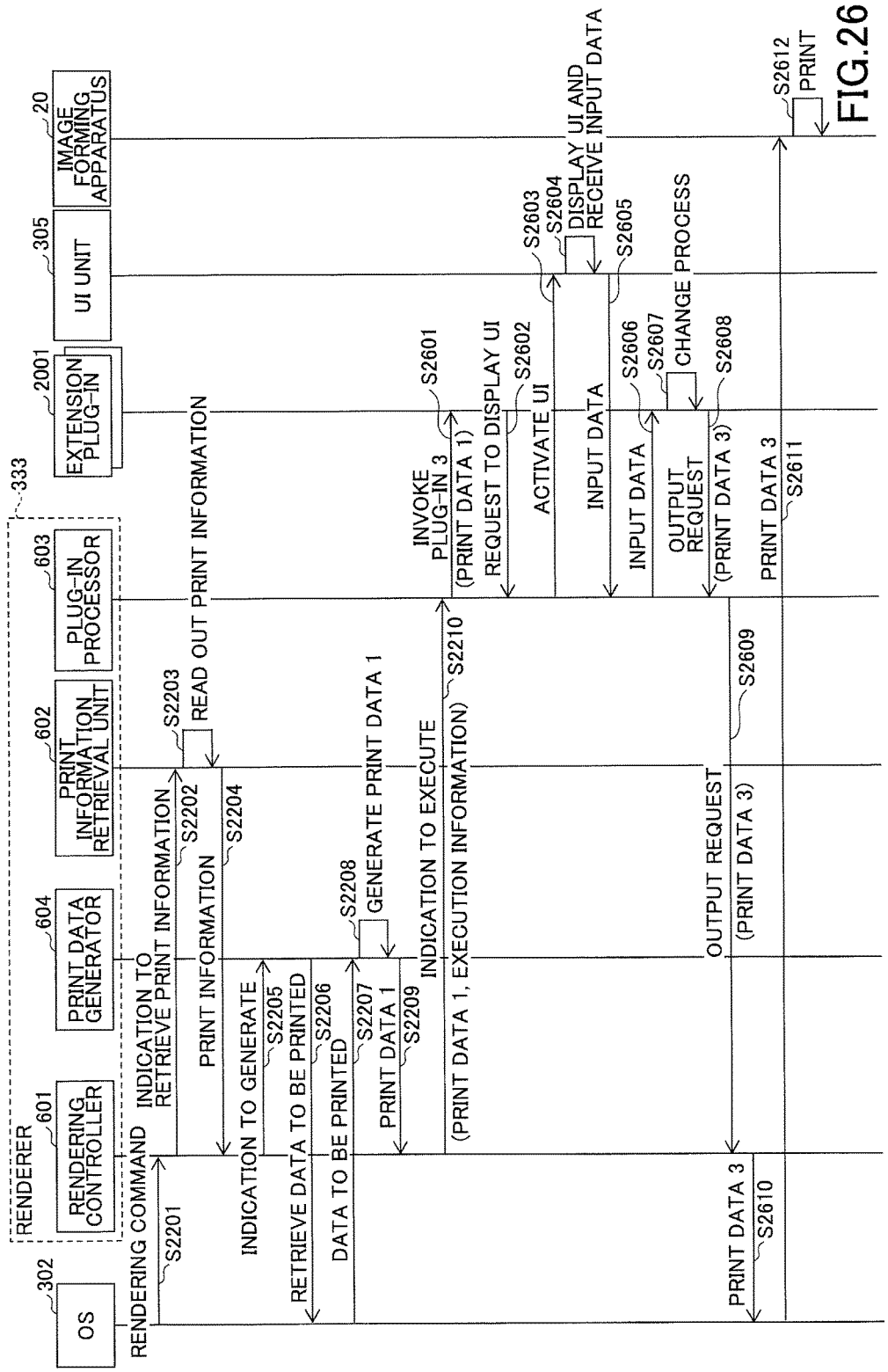
FIG. 26 is a sequence diagram illustrating an example of the process by the information processing system according to the sixth example.

<Processing Flow>
FIG. 26 is a sequence diagram illustrating an example of a process by the information processing system according to the sixth example. Note that the processes from steps S2201 through S2210 of FIG. 26 are the same as the corresponding processes of the fifth example illustrated in FIG. 22, so that the difference from the fifth example is mainly described here.

At steps S2601 through S2608, the plug-in processor 603 invokes one or more extension plug-ins 2001 in accordance with the execution information 612 included in the indication to execute, and the plug-in processor 603 causes the one or more extension plug-ins 2001 to execute the process. In the following description, it is assumed that the execution information 612 includes the information of the plug-in 3 including the process of displaying the UI.

At step S2601, the execution controller 2101 of the plug-in processor 603 invokes the plug-in 3, and the execution controller 2101 transmits the print data 1 to the plug-in 3. As a result, the process controller 2103 of the plug-in 3 causes the processor 2104 to execute the predetermined process (e.g., a changing process for changing the print data by displaying the UI and using the input data).

At step S2602, the processor 2104 of the plug-in 3 transmits, to the plug-in processor 603, the UI display request for requesting to display the UI using the UI calling unit 2502. The UI display request includes, for example, UI information for displaying the UI. Note that the UI information includes, for example, information on the size and the title of the screen, and the content to be displayed on the screen.

At step S2603, upon receiving the UI display request, the UI controller 2501 of the plug-in processor 603 requests the UI unit 305 to activate the UI, and the UI controller 2501 transmits the UI information to the UI unit 305.

At step S2604, the UI unit 305 displays the UI using the received UI information, and the UI unit 305 receives input data input by a user. Namely, the display content to be displayed by the UI is generated by the extension plug-in 2001, and displaying of the UI is executed in a process of the UI unit 305.

At step S2605, the UI unit 305 transmits the received input data to the plug-in processor 603.

At step S2606, the UI controller 2501 of the plug-in processor 603 transmits the input data received from the UI unit 305 to the UI calling unit 2502 of the plug-in 3, which is the request source.

At step S2607, the processor 2104 of the plug-in 3 executes the changing process for changing the print data using the input data received by the UI calling unit 2502, and the processor 2104 generates print data 3.

At step S2608, the processor 2104 of the plug-in 3 requests the renderer 333 to output (print) the print data 3 using the output request unit 2105.

Note that, other than the extension plug-in 2001 that executes the above-described changing process, the UI may be displayed by an extension plug-in 2001 that executes the process of transferring the print data to the server apparatus 30.

In this case, the UI unit 305 displays, at step S2604, the UI displaying a choice of whether the transfer process is to be executed, and the UI unit 305 receives a selection operation by a user.

Upon receiving, by the UI unit 305, the choice of executing the transfer process, the extension plug-in 2001 transfers the print data 3 to the server apparatus 30 at step S2607, and, at step S2608, the extension plug-in 2001 reports, to the renderer 333, that the process is terminated. At this time, the extension plug-in 2001 does not transmit a request for outputting the print data 3 to the renderer 333.

However, when the UI unit 305 receives the choice of not executing the transfer process, the extension plug-in 2001 does not executes any process at step S2607, and the extension plug-in 2001 requests the renderer 333 to output the print data 3 at step S2608.

In this manner, according to this example, the plug-in processor 603 is provided with the UI controller 2501 that causes the UI unit 305 to display the UI, in response to the UI display request from the extension plug-in 2001. Consequently, the printer driver 303 can cause the extension plug-in 2001 to execute various types of extension functions that use input data input by using the UI.

Furthermore, in this example, the extension plug-in 2001 can display the UI using the UI controller 2501 of the plug-in processor 603. Accordingly, even if a plurality of extension plug-ins 2001 is to be embedded in the client device 10, it is not necessary to provide, for each extension plug-in 2001, an application (executable file) for displaying the UI. Consequently, in the client device 10 according to this example, it is possible to prevent that a plurality of displaying processes is executed for a single print process during execution of printing.

Seventh Example

In the examples 5 and 6, the plug-in processor 603 causes the extension function to be executed using the extension plug-in 2001 after the print data is generated. However, this is an example, and the plug-in processor 603 may cause the extension function to be executed using the extension plug-in 2001 at another timing, such as the timing to start or terminate the printing process.

<Processing Flow>

Figure 27:
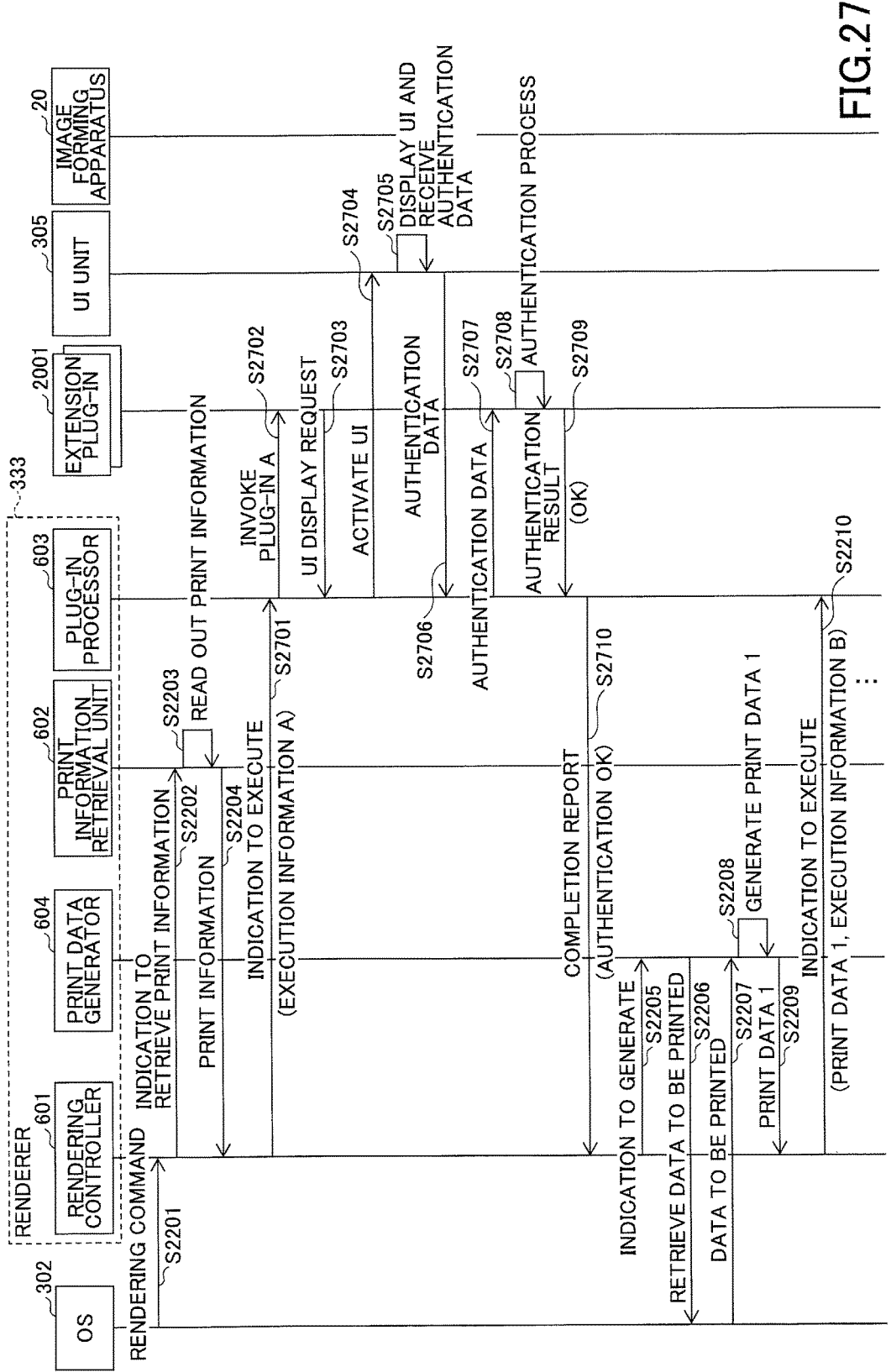
FIG. 27 is a sequence diagram illustrating an example of the process by the information processing system according to a seventh example.

FIG. 27 is a sequence diagram illustrating an example of the process by the information processing system according to the seventh example. This process illustrates an example of the process of executing the extension function using the extension plug-in 2001 at the timing to start the printing process. Note that the processes of steps S2201 through S2204 and S2205 through S2210 in FIG. 27 are the same as the corresponding processes of the fifth example illustrated in FIG. 22, so that the difference from the fifth example is mainly described here.

Furthermore, it is assumed here that the print information retrieved at step S2204 includes execution information 2800, such as that of illustrated in FIG. 28.

In the execution information 2800 illustrated in FIG. 28, each of execution information 2801 of a plug-in A and execution information 2803 of a plug-in B includes an information element "Timing," in addition to the information elements "name," "path," and "ReadOnly," which are described in FIG. 23.

The information element "Timing" is an example of information indicating the timing of executing each plug-in. For example, "Start" indicates that the extension plug-in 2001 is invoked at a timing to start the printing process. Further, "Page" indicates that the extension plug-in 2001 is invoked at a timing of generating the print data.

For example, in the execution information 2801 of the plug-in A in FIG. 28, "Start" is set in the information element "Timing" 2082, so that the plug-in A is invoked at the timing to start the printing process. Further, in the execution information 2803 of the plug-in B in FIG. 29, "Page" is set in the information element "Timing" 2805, so that the plug-in B is invoked at the timing to generate the print data.

At step S2701 of FIG. 27, the rendering controller 601 transmits, to the plug-in processor 603, execution information of a plug-in to be invoked at a timing to start the printing process (execution information A). In the example of the execution information 2800 illustrated in FIG. 28, the execution information 2801 of the plug-in A is transmitted to the plug-in processor 603.

At steps S2702 through S2710, the plug-in processor 603 invokes the plug-in A so as to cause the plug-in A to execute the process in accordance with the execution information A included in the indication to execute. In the following description, it is assumed that the plug-in A is a plug-in for executing an authentication process for a user using the UI.

At step S2702, the execution controller 2101 of the plug-in processor 603 invokes the plug-in A so as to cause the plug-in A to start execution of the process.

At step S2703, the processor 2104 of the plug-in A transmits the UI display request for requesting to display the UI to the plug-in processor 603 using the UI calling unit 2502. This UI display request includes, for example, the UI information for displaying the authentication screen.

Upon receiving the UI display request, the UI controller 2501 of the plug-in processor 603 requests, at step S2704, the UI unit 305 to activate the UI, and the UI controller 2051 transmits the UI information to the UI unit 305.

At step S2705, the UI unit 305 displays the UI of the authentication screen using the received UI information, and the UI unit 305 receives authentication data (e.g., a password) input by a user.

At step S2706, the UI unit 305 transmits the received authentication data to the plug-in processor 603.

At step S2707, the UI controller 2501 of the plug-in processor 603 transmits the authentication data received from the UI unit 305 to the UI calling unit 2502 of the plug-in A, which is the request source.

At step S2708, the processor 2104 of the plug-in A executes an authentication process using the authentication data received by the UI calling unit 2502.

At step S2709, the processor 2104 of the plug-in A transmits an authentication result ("authentication OK" in the example of FIG. 27) to the plug-in processor 603 of the renderer 222.

At step S2710, the plug-in processor 603 transmits a completion report including the authentication result to the rendering controller 601.

In response to detecting that the authentication result is "OK," the rendering controller 601 causes the process on and after step S2205 to be executed. However, in response to detecting that the authentication result is not "OK," the rendering controller 601 terminates the printing process.

In this manner, the plug-in processor 603 of the renderer 333 can invoke the extension plug-in 2001 at the timing to start the printing process so as to cause the extension plug-in 2001 to execute the extension function.

Similarly, the plug-in processor 603 may invoke the extension plug-in 2001 at the timing to terminate the printing process so as to cause the extension plug-in 2001 to execute the extension function. In this case, for example, in the execution information 2800 illustrated in FIG. 28, "End" is set in the information element "Timing."

Eighth Example

The examples 1 through 7 are described on the assumption that the functions of the printer driver 303 are included in the client device 10.

However, for example, for executing the printing process using the point and print function of the OS 302, the functional configuration included in the printer driver 303 may be distributed between the client device 10 and the server apparatus 30. In this example, an example of a process of executing server side rendering is described in which the print data is generated by the server apparatus 30.

<Functional Configuration>

Figure 29:
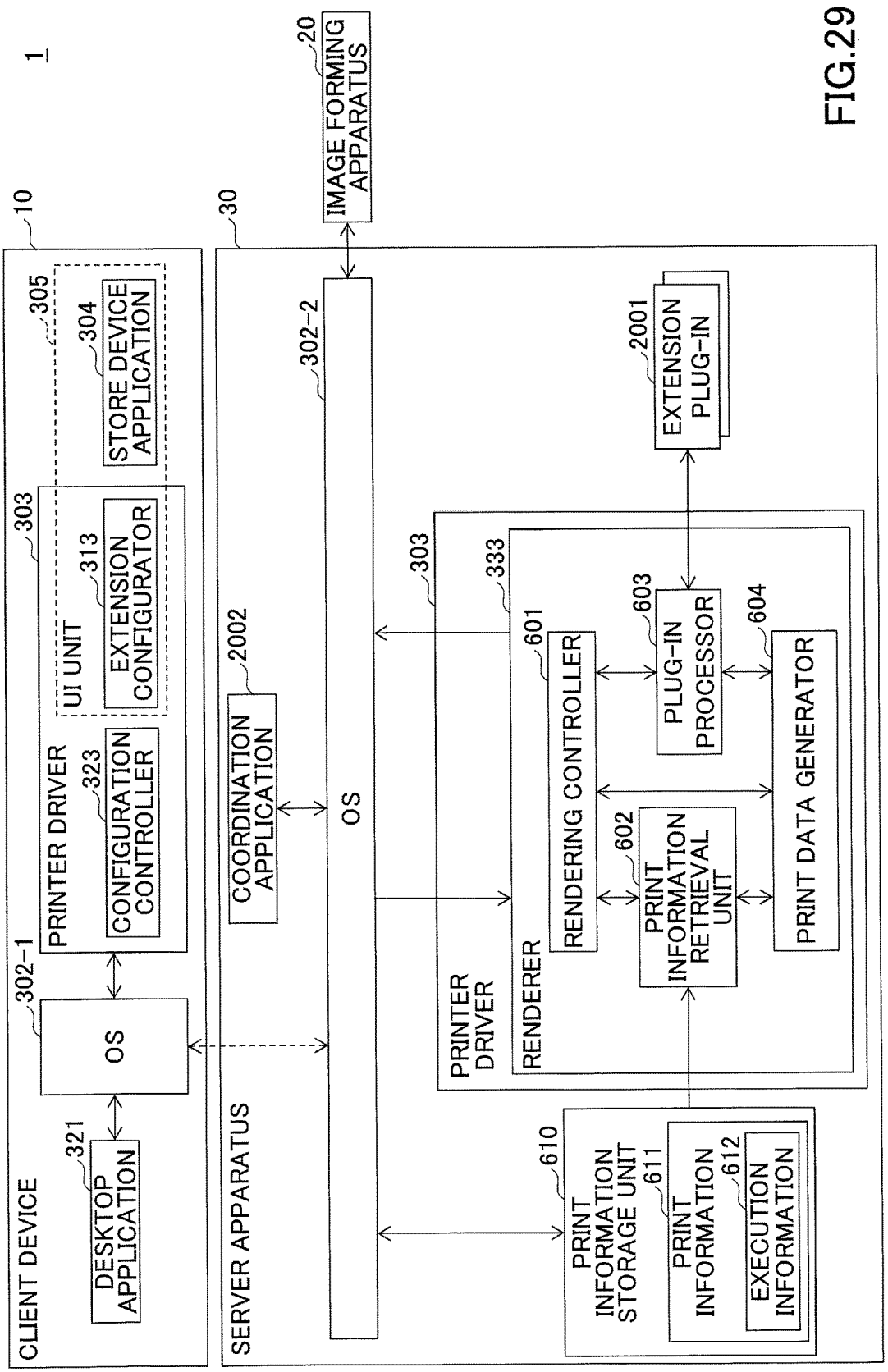
FIG. 29 is a functional configuration diagram of the information processing system according to an eighth example.

FIG. 29 is a configuration diagram of the information processing system according to the eighth example.

The client device 10 according to this example includes, for example, the desktop application 321, the OS 302 (OS 302-1), the printer driver 303, and the UI unit 305 of the functional configuration included in the client device 10 according to the sixth example illustrated in FIG. 24. Furthermore, the client device 10 uses the configuration controller 323 and the extension configurator 313 of the functional configuration included in the printer driver 303.

The server apparatus 30 according to this example includes, for example, the coordination application 2002, the OS 302 (OS 302-2), the print information storage unit 610, the printer driver 303, and the one or more extension plug-ins 2001 of the functional configuration included in the client device 10 according to the sixth example illustrated in FIG. 24. Further, the server apparatus 30 uses the renderer 333 of the functional configuration included in the printer driver 303.

Note that, for example, the function of each component is the same as the functional configuration described in the sixth example illustrated in FIG. 24.

<Processing Flow>

Figure 30:
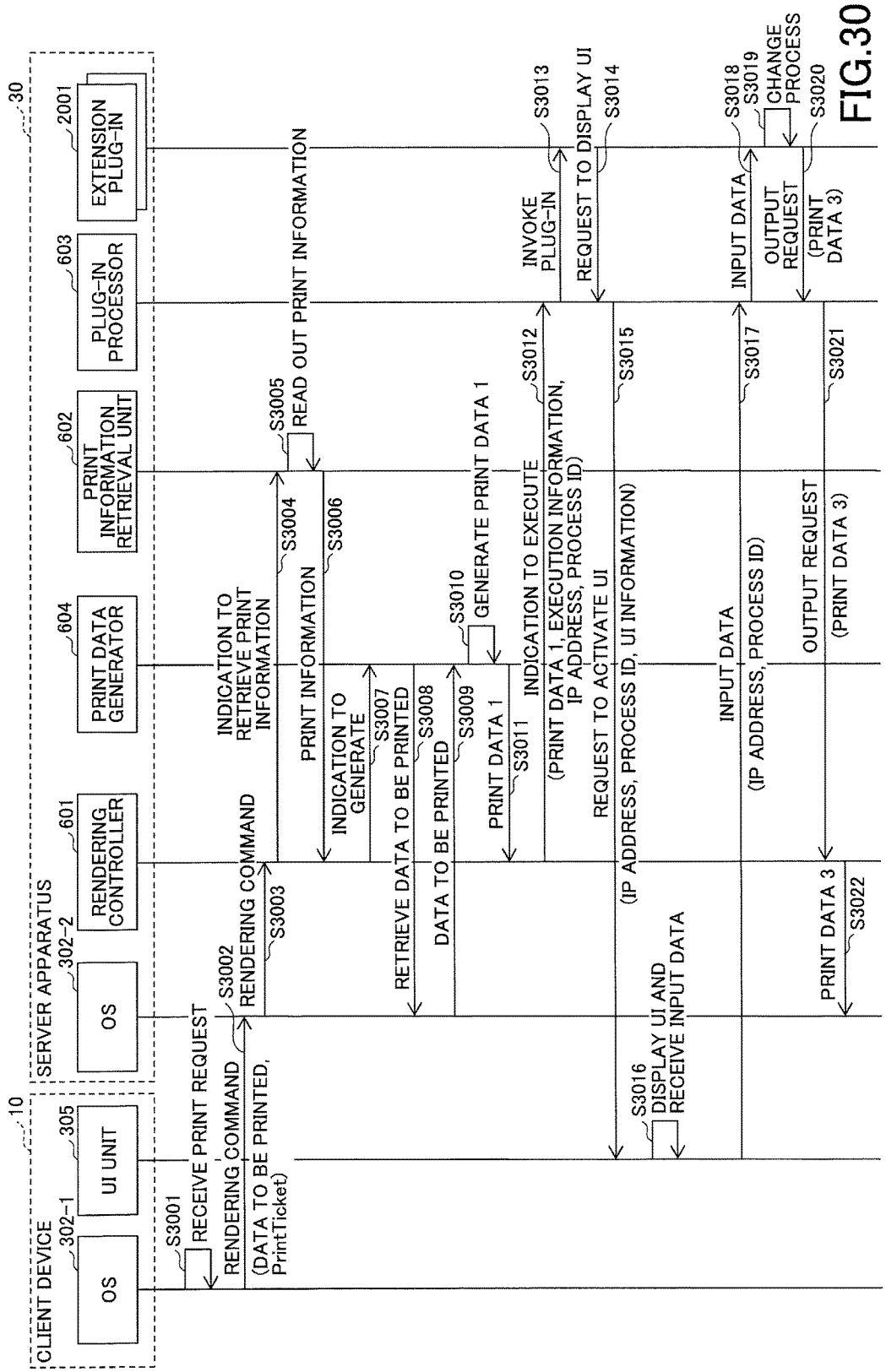
FIG. 30 is a sequence diagram illustrating an example of the process by the information processing system according to the eighth example.

FIG. 30 is a sequence diagram illustrating an example of a process by the information processing system according to the eighth example. In this example, a print operation is performed by a user on the client device 10, and the rendering process is executed by the server apparatus 30. In this case, the rendering process executed by the renderer 333 of the printer driver 303 installed in the server apparatus 30 is basically the same as the rendering process of each of the fifth through seventh examples.

However, when the extension plug-in 2001 at the server apparatus 30 executes a process of displaying the UI, it is required to display the UI on the client device 10. Here, a process, by the extension plug-in 2001 at the server apparatus 30, of causing the UI to be displayed on the client device 10 is mainly described.

At step S3001, the OS 302-1 of the client device 10 receives a print request from the desktop application 321. The print request includes, for example, the PrintTicket, which is the configuration information of printing. Further, it is assumed that the PrintTicket includes, for example, an IP address of the client device 10 and a process ID of the UI unit 305 corresponding to the print request. Note that the PrintTicket is generated by the configuration controller 323 when the desktop application 321 requests the printer driver 303 to retrieve the PrintTicket via the OS 302, for example.

At step S3002 and S3003, the OS 302-1 transmits a rendering command for requesting generation of the print data to the rendering controller 601 of the renderer 333 of the server apparatus 30 via the OS 302-2 of the server apparatus 30.

Upon receiving the rendering command, the rendering controller 601 indicates, at step S3004, the print information retrieval unit 602 to retrieve the print information 611.

At step S3005, the print information retrieval unit 602 reads out the print information 611 stored in the print information storage unit 610. Here, it is assumed that the print information 611 includes the execution information 612 for the process to be executed by the one or more extension plug-ins 2001. The extension information is stored in the print information 611 by the coordination application 2002.

At step S3006, the print information retrieval unit 602 transmits the retrieved print information 611 to the rendering controller 601.

At step S3007, the rendering controller 601 indicates the print data generator 604 to generate the print data.

At steps S3008 and S3009, the print data generator 604 retrieves the data to be printed from the spooler of the OS 302-2 storing the data to be printed.

At step S3010, the print data generator 604 generates print data 1 by converting the data to be printed into the print data that can be printed by the image forming apparatus 20.

At step S3011, the print data generator 604 transmits the generated print data 1 to the rendering controller 601.

At step S3012, the rendering controller 601 transmits, to the plug-in processor 603, the indication to execute including the print data 1, the execution information 612, the IP address of the client device 10, and the process ID.

At steps S3013 through S3026, the plug-in processor 603 invokes one or more extension plug-ins 2001 in accordance with the execution information 612 included in the indication to execute, and the plug-in processor 603 causes the one or more extension plug-ins 2001 to execute the process. In the following description, it is assumed that the execution information 612 includes the information on the plug-in 3 including the process for displaying the UI.

At step S3013, the execution controller 2101 of the plug-in processor 603 invokes the extension plug-in 2001 (plug-in 3), and the execution controller 2101 transmits the print data 1 to the extension plug-in 2001. Then, the process controller 2103 of the extension plug-in 2001 causes the processor 2104 to execute the predetermined process (e.g., a changing process of displaying the UI and changing the print data using the input data).

At step S3014, the processor 2104 of the extension plug-in 2001 transmits the UI display request for requesting the plug-in processor 603 to display the UI using the UI calling unit 2502. The UI display request includes, for example, the UI information for displaying the UI.

At step S3015, upon receiving the UI display request, the UI controller 2501 of the plug-in processor 603 transmits a UI activation request for requesting the client device 10 to activate the UI via the OS 302-2. The UI activation request includes, for example, the IP address of the client device 10, the process ID and the UI information.

As another example, the UI controller 2501 of the plug-in processor 603 may transmit the UI activation request including the UI information to the rendering controller 601. In this case, the rendering controller 601 adds the IP address of the client device 10 and the process ID to the UI activation request, and the rendering controller 601 transmits the UI activation request to the client device 10 via the OS 302-2.

At step S3016, the UI unit 305 of the client device 10 displays the UI using the received UI information, and the UI units 306 receives input data input by a user.

At step S3017, the UI unit 305 of the client device 10 transmits the input data to the plug-in processor 603, which is the request source.

At step S3018, the UI controller 2501 of the plug-in processor 603 transmits the received input data to the UI calling unit 2502 of the extension plug-in 2001, which is the request source.

At step S3019, the processor 2104 of the extension plug-in 2001 generates print data 3 by executing a changing process of changing the print data using the input data received by the UI calling unit 2502.

At step S3020, the processor 2104 of the extension plug-in 2001 requests the renderer 333 to output (print) the print data 3 using the output request unit 2105.

At step S3021, the output controller 2102 of the plug-in processor 603 transmits an output request including the received print data 3 to the rendering controller 601.

At step S3022, the rendering controller 601 transmits the print data 3 to the OS 302-2, so that the image forming apparatus 20 in FIG. 29 executes printing, for example.

As described above, even if the functional configuration of the printer driver 303 is distributed between the client device 10 and the server apparatus 30, the process can be executed similar to the case where the functional configuration of the printer driver 303 is located in the client device 10.

Ninth Example

Figure 31:
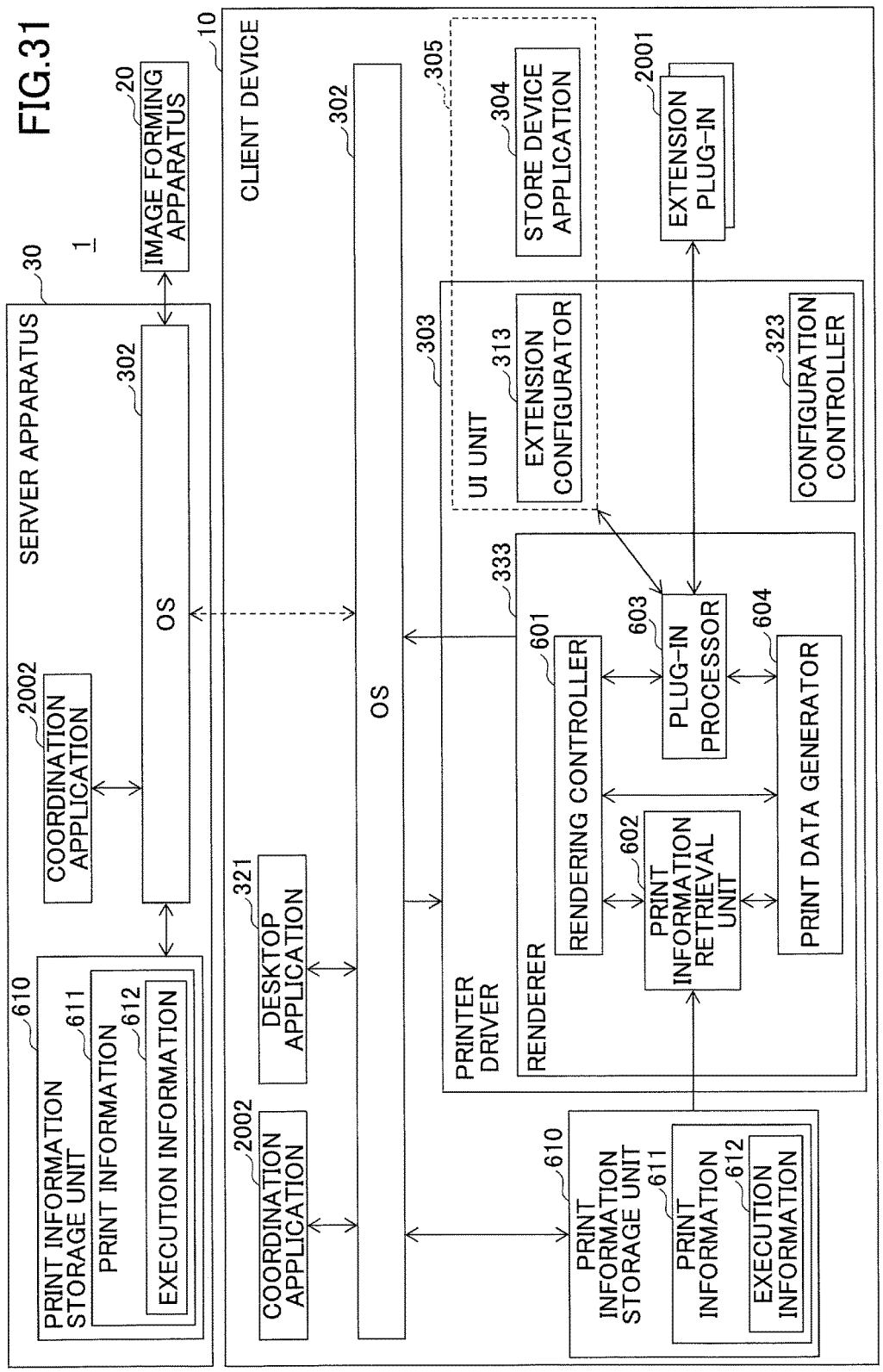
FIG. 31 is a functional configuration diagram of the information processing system according to a ninth example.

FIG. 31 is a functional configuration diagram of the information processing system according to the ninth example. In this example, an example of a case is described where printing is executed by using the point and print function of the OS 302 and the client side rendering is executed, which is for generating the print data at the client device 10.

In this case, the functional configuration of the client device 10 may be the same as the functional configuration of the client device 10 according to the sixth example illustrated in FIG. 24, for example. In the example of FIG. 31, the client device 10 can execute printing by using the image forming apparatus 20 coupled to the server apparatus 30. In this case, the process executed by the renderer 333 of the printer driver 303 is the same as the process of the sixth example illustrated in FIG. 26.

Furthermore, in FIG. 31, the printer driver 303 can be installed from the server apparatus 30 to the client device 10 using the point and print function of the OS 302. In this case, the print information 611 and the execution information 612 stored in the print information storage unit 610 of the server apparatus 30 are transferred to the print information storage unit 610 of the client device 10.

Consequently, for example, as described in the examples 1 through 4, when the plug-in processor 603 executes the process in accordance with the execution information 612 (e.g., the script and the address information), the client device 10 can use the extended function as it is.

The present invention is not limited to the specifically disclosed embodiments, and variations and modifications may be made without departing from the scope of the present invention.

The present application is based on and claims the benefit of priority of Japanese priority application No. 2016-180201, filed on Sep. 15, 2016, and Japanese priority application No. 2016-231107, filed on Nov. 29, 2016, the entire contents of which are hereby incorporated herein by reference.

What is claimed is:

1. An information processing device for executing a program for printing, the information processing device including a processor;
   an operative system (OS);
   a spooler storing data;
   a print data generator; and
   a memory that stores instructions, wherein the memory stores print information used for printing in an area of the memory accessible by the program for printing,
   wherein, when the instructions stored in the memory are executed, the instructions cause the processor to execute the following steps:
   retrieving, from the area of the memory accessible by the program for printing, the print information;
   upon detecting that the retrieved print information includes a script including timing information indicating a timing at which the script is to be executed,
   executing the script to implement a predetermined process at the timing indicated by the timing information; and
   upon detecting a successful completion of the predetermined process,
   transmitting a completion report indicating that the predetermined process has been completed to the print data generator,
   retrieving the data to be printed from the spooler of the OS storing the data to be printed, and
   converting the data to be printed into print data that is printable by an image forming apparatus.

2. The information processing device according to claim 1, wherein the print information includes configuration information for the processor to execute the predetermined process.

3. The information processing device according to claim 1, wherein the memory includes, for each logical printer, a storage area for storing configuration information of the program for printing.

4. The information processing device according to claim 1, wherein the program for printing is a printer driver.

5. The information processing device according to claim 4, wherein the printer driver is a V4 printer driver including one or more filters, and
wherein the step of converting and the step of executing are processed within a range of a single filter.

6. The information processing device according to claim 1, wherein the predetermined process includes a process of transmitting the print data to an external device.

7. The information processing device according to claim 6, wherein the print information includes address information of the external device.

8. The information processing device according to claim 1, wherein the predetermined process includes a process of displaying the print data for preview.

9. The information processing device according to claim 1, wherein the processor causes one or more extension plug-ins stored outside the program for printing to execute the predetermined process based on the print information.

10. The information processing device according to claim 9, wherein the print information includes path information for invoking the one or more extension plug-ins.

11. The information processing device according to claim 10, wherein the information processing device includes a user interface unit for displaying a predetermined user interface and for receiving input data input by a user, and
wherein, upon receiving a request for displaying the predetermined user interface from the one or more extension plug-ins, the processor causes the user interface unit to display the predetermined user interface.

12. The information processing device according to claim 9, wherein, in response to receiving a request from the one or more extension plug-ins, the processor causes the image forming apparatus to output the print data.

13. An information processing system comprising:
an image forming apparatus that performs printing; and
an information processing device that executes a program for printing that causes the image forming apparatus to print,
wherein the information processing device includes a processor;
an operative system (OS);
a spooler storing data;
a print data generator; and
a memory that stores instructions, wherein the memory stores print information used for printing in an area of the memory accessible by the program for printing,
wherein, when the instructions stored in the memory are executed, the instructions cause the processor to execute the following steps:
retrieving, from the area of the memory accessible by the program for printing, the print information;
upon detecting that the retrieved print information includes a script including timing information indicating a timing at which the script is to be executed,
executing the script to implement a predetermined process at the timing indicated by the timing information; and
upon detecting a successful completion of the predetermined process,
transmitting a completion report indicating that the predetermined process has been completed to the print data generator,
retrieving the data to be printed from the spooler of the OS storing the data to be printed, and
converting the data to be printed into print data that is printable by the image forming apparatus.

14. An information processing method executed by an information processing device for executing a program for printing, the information processing device including a processor, an operative system (OS), a spooler storing data, a print data generator and a memory that stores print information used for printing in an area of the memory accessible by the program for printing,
the information processing method comprising:
retrieving, from the area of the memory accessible by the program for printing, the print information; upon detecting that the retrieved print information includes a script including timing information indicating a timing at which the script is to be executed,
executing the script to implement a predetermined process at the timing indicated by the timing information; and
upon detecting a successful completion of the predetermined process,
transmitting a completion report indicating that the predetermined process has been completed to the print data generator,
retrieving the data to be printed from the spooler of the OS storing the data to be printed, and
converting the data to be printed into print data that is printable by an image forming apparatus.

* * * * *